(12) United States Patent
Yamamoto et al.

(10) Patent No.: US 8,515,477 B2
(45) Date of Patent: Aug. 20, 2013

(54) BASE STATION AND COMMUNICATION METHOD

(75) Inventors: Naotake Yamamoto, Osaka (JP);
Hiroshi Hayashino, Hyogo (JP);
Hironori Nakae, Osaka (JP); Naganori Shirakata, Osaka (JP)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 12/673,885

(22) PCT Filed: Jun. 26, 2009

(86) PCT No.: PCT/JP2009/002967
§ 371 (c)(1),
(2), (4) Date: Feb. 17, 2010

(87) PCT Pub. No.: WO2010/001570
PCT Pub. Date: Jan. 7, 2010

(65) Prior Publication Data
US 2011/0086661 A1    Apr. 14, 2011

(30) Foreign Application Priority Data
Jun. 30, 2008   (JP) .................................. 2008-171819

(51) Int. Cl.
*H04W 72/08*   (2009.01)
(52) U.S. Cl.
USPC ............. 455/513; 455/509; 455/450; 455/69; 455/464; 455/226.2; 455/231; 455/115.3; 455/134

(58) Field of Classification Search
None
See application file for complete search history.

(56) References Cited

U.S. PATENT DOCUMENTS

| 5,870,666 A * | 2/1999 | Tanaka et al. ............. 455/67.11 |
| 2003/0142658 A1 * | 7/2003 | Ofuji et al. ................... 370/349 |
| 2004/0208232 A1 * | 10/2004 | Sudo ............................. 375/146 |
| 2007/0178875 A1 * | 8/2007 | Rao et al. ................... 455/343.1 |
| 2008/0081651 A1 * | 4/2008 | Kuroda et al. ............... 455/509 |
| 2008/0188186 A1 * | 8/2008 | Hwang et al. .................. 455/69 |
| 2009/0175369 A1 | 7/2009 | Atarashi et al. |

FOREIGN PATENT DOCUMENTS

| JP | 2007-104054 | 4/2007 |
| JP | 2007-214824 | 8/2007 |
| JP | 2008-48365 | 2/2008 |
| WO | 2006/016457 | 2/2006 |

OTHER PUBLICATIONS

International Search Report issued Oct. 6, 2009 in corresponding International Application No. PCT/JP2009/002967.

* cited by examiner

*Primary Examiner* — Yuwen Pan
*Assistant Examiner* — Fanghwa Wang
(74) *Attorney, Agent, or Firm* — Wenderoth, Lind & Ponack, L.L.P.

(57) ABSTRACT

A base station includes: an estimation section estimating transmission condition of each of frequency channels used for communication; a reception section receiving a data signal from each communication terminal through any of the frequency channels; a measurement section measuring received signal power of the received data signal for each frequency channel; a determination section determining, for each frequency channel, whether the received data signal is demodulated errorlessly; and a control section assigning frequency channels estimated as being in good transmission condition by the estimation section, to communication terminals the data signals of which are determined as not being errorlessly demodulated by the determination section, such that a frequency channel in a better transmission condition is assigned preferentially to a communication terminal having larger received signal power detected by the detection section, and transmitting retransmission request signals requesting the communication terminals to retransmit the data signals using the assigned frequency channels.

16 Claims, 14 Drawing Sheets

F I G. 9

(a)

| STA ID | RSSI[dBm] |
|---|---|
| STA10-1 | -40 |
| STA10-2 | -45 |
| STA10-3 | -47 |
| STA10-4 | -50 |
| STA10-5 | -65 |
| STA10-6 | -70 |
| STA10-7 | -88 |
| STA10-8 | -78 |
| STA10-9 | -90 |
| STA10-10 | -85 | t=t1

(b)

| STA ID | RSSI[dBm] |
|---|---|
| STA10-1 | -32 |
| STA10-2 | -40 |
| STA10-3 | -45 |
| STA10-4 | -44 |
| STA10-5 | -53 |
| STA10-6 | -62 |
| STA10-7 | -80 |
| STA10-8 | -69 |
| STA10-9 | -72 |
| STA10-10 | -80 | t=t2

FIG. 10

(a)
CH (CHANNEL)

| | t1 | t2 | t3 | t4 | t5 | t6 | t7 | t8 |
|---|---|---|---|---|---|---|---|---|
| CH4 | ○ | × | × | – | ○ | × | × | × |
| CH3 | ○ | ○ | ○ | – | ○ | × | – | × |
| CH2 | × | ○ | – | ○ | ○ | ○ | ○ | ○ |
| CH1 | ○ | ○ | ○ | ○ | ○ | ○ | ○ | ○ |

○: COMMUNICATION OK
×: COMMUNICATION NG

RECEIVED DATA DETERMINATION TABLE (b)
CH (CHANNEL)

| | t1 | t2 | t3 | t4 | t5 | t6 | t7 | t8 |
|---|---|---|---|---|---|---|---|---|
| CH4 | 100 | 50 | 33 | 33 | 50 | 40 | 33 | 29 |
| CH3 | 100 | 100 | 100 | 100 | 100 | 80 | 80 | 67 |
| CH2 | 0 | 50 | 50 | 67 | 75 | 80 | 83 | 86 |
| CH1 | 100 | 100 | 100 | 100 | 100 | 100 | 100 | 100 |

COMMUNICATION SUCCESS CUMULATIVE PROBABILITY INFORMATION TABLE [%]

(c)
CHANNEL QUALITY: HIGH

| | t1 | t2 | t3 | t4 | t5 | t6 | t7 | t8 |
|---|---|---|---|---|---|---|---|---|
| | ch1 | ch1 | ch1 | ch1 | ch1 | ch1 | ch1 | ch1 |
| | ch3 | ch3 | ch3 | ch3 | ch3 | ch2 | ch2 | ch2 |
| | ch4 | ch2 | ch2 | ch2 | ch2 | ch3 | ch3 | ch3 |
| | ch2 | ch4 | ch4 | ch4 | ch4 | ch4 | ch4 | ch4 |

CHANNEL QUALITY: LOW

CHANNEL QUALITY TABLE

F I G. 1 1

| STA ID | RSSI [dBm] | RECEPTION DETERMINATION | RETRANSMISSION CHANNEL ch | RETRANSMISSION DATA SLOT TIME |
|---|---|---|---|---|
| STA10-1 | −40 | OK | − | − |
| STA10-2 | −45 | NG | CH1 | t2 |
| STA10-3 | −47 | NG | CH3 | t2 |
| STA10-4 | −50 | OK | − | − |
| STA10-5 | −65 | NG | CH3 | t3 |
| STA10-6 | −70 | NG | CH4 | t2 |
| STA10-7 | −88 | NG | CH2 | t3 |
| STA10-8 | −78 | NG | CH4 | t3 |
| STA10-9 | −90 | NG | CH2 | t4 |
| STA10-10 | −85 | NG | CH2 | t2 | t=t1

| DA DESTINATION ADDRESS | SA SOURCE ADDRESS | CH SPECIFIED RETRANSMISSION CHANNEL | Time SPECIFIED RETRANSMISSION SLOT TIME | CRC ERROR DETECTION |
|---|---|---|---|---|

F I G. 1 5

(a) t=t0

| STA ID | RSSI[dBm] | flag |
|---|---|---|
| STA10-21 | -45 | |
| STA10-22 | -50 | |
| STA10-23 | -52 | |
| STA10-24 | -55 | |
| STA10-25 | -70 | |
| STA10-26 | -75 | |
| STA10-27 | -93 | |
| STA10-28 | -83 | |
| STA10-29 | -95 | |
| STA10-30 | -90 | |

(b) t=t1

| STA ID | RSSI[dBm] | flag |
|---|---|---|
| STA10-21 | -40 | |
| STA10-22 | -45 | |
| STA10-23 | -57 | ✓ |
| STA10-24 | -50 | |
| STA10-25 | -65 | |
| STA10-26 | -70 | |
| STA10-27 | -88 | |
| STA10-28 | -78 | |
| STA10-29 | -90 | |
| STA10-30 | -85 | |

F I G. 1 6

| STA ID | RSSI [dBm] | flag | RECEPTION DETERMINATION | RETRANSMISSION CHANNEL ch | RETRANSMISSION DATA SLOT TIME |
|---|---|---|---|---|---|
| STA10-21 | -40 | | OK | - | - |
| STA10-22 | -45 | | NG | CH3 | t2 |
| STA10-23 | -57 | ✓ | NG | CH1 | t2 |
| STA10-24 | -50 | | OK | - | - |
| STA10-25 | -65 | | NG | CH3 | t3 |
| STA10-26 | -70 | | NG | CH4 | t2 |
| STA10-27 | -88 | | NG | CH2 | t3 |
| STA10-28 | -78 | | NG | CH4 | t3 |
| STA10-29 | -90 | | NG | CH2 | t4 |
| STA10-30 | -85 | | NG | CH2 | t2 | t=t1

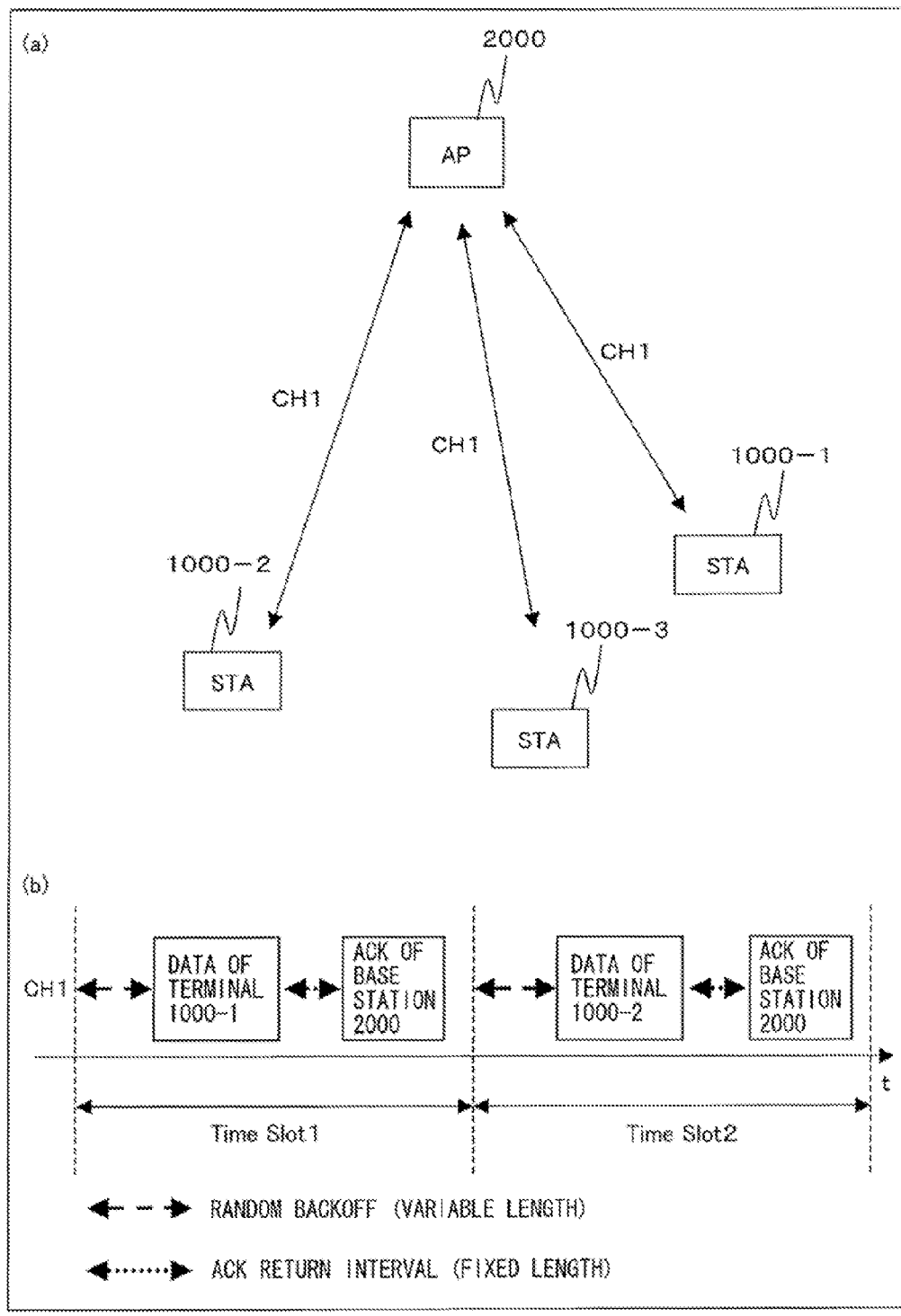

BASE STATION AND COMMUNICATION METHOD

TECHNICAL FIELD

The present invention relates to a wireless communication system having a large number of terminals, and more particularly, to a method of selecting channels and times in wireless networks such as a sensor network and an active RF tag system, which include a large number of terminals.

BACKGROUND ART

In recent years, networks such as a WPAN (Wireless Personal Area Network) and a sensor network, which include compact and low-power-consumption wireless terminals, are attracting attention. As a system similar to these networks, there is a system using active RF tags, each tag actively emitting a wireless signal. A wireless terminal used in these networks has a low data rate (from several kbps to several hundreds of kbps), and a short wireless-signal reaching distance (from several meters to several tens of meters). However, the wireless terminal is compact, and extremely low in power consumption so that it is drivable for several years with a battery embedded therein. Further, there is a passive type wireless terminal needing no battery.

These wireless networks are expected to be applied to a system in which compact wireless terminals are attached to individual articles, and when a large number of the articles enter a communication area of a control terminal as a base station, identification, tracking, and management for these articles are performed by wireless communication.

Further, the wireless networks are also expected to be applied to a system in which a control terminal as a base station is set on a school gate or the like, students commuting to the school are given compact wireless terminals, and authentication of each terminal is conducted when each student passes through the school gate, thereby to detect that the student has passed through the gate.

As one of conventional wireless communication systems to be used in the WPAN, there has been a system using a slot CSMA (Carrier Sense Multiple Access) method (e.g., see Patent Literature 1).

(a) of FIG. 17 shows a network diagram of a wireless communication system disclosed in Patent Literature 1. The wireless communication system includes a base station 2000 that manages a network and connects the same to a backborn network, and terminals 1000-1 to 1000-3 that communicate with the base station 2000 via the wireless network. These terminals 1000-1 to 1000-3 perform communication with sharing the same channel CH1.

(b) of FIG. 17 shows an example of the slot CSMA method disclosed in Patent Literature 1. In a time slot 1, the terminal 1000-1 performs carrier sense after variable-length random backoff to confirm that the wireless network is not occupied, and transmits data to the base station 2000. The base station 2000 returns an ACK to the terminal after a fixed-length ACK (Acknowledgment) return interval has elapsed. Returning the ACK from the base station 2000 allows the terminal 1000-1 to recognize that data reception has succeeded.

In a time slot 2, as in the time slot 1, the terminal 1000-2 transmits data to the base station 2000, and the base station returns an ACK to the terminal after a fixed-length ACK return interval has elapsed.

As described above, in the conventional art, the terminals 1000-1 to 1000-3 perform carrier sense after random backoff, from the beginnings of the respective time slots, and then transmit data. Thereby, collisions of data are reduced, and the quality of communication is improved.

Meanwhile, as another conventional wireless communication system, there is a system performing communication using a plurality of frequency channels (e.g., see Patent Literature 2). In the communication system using a plurality of frequencies which is disclosed in Patent Literature 2, the communication channel qualities are determined according to the communication link conditions, e.g., the RSSI (Received Signal Strength Indicator, received signal power), the bit error rate, and the packet error rate, and communication is performed using high-quality channels.

CITATION LIST

Patent Literature

Patent Literature 1: Japanese Laid-Open Patent Publication No. 2008-48365
Patent Literature 2: Japanese Laid-Open Patent Publication No. 2007-104054

DISCLOSURE OF THE INVENTION

Problems to be Solved by the Invention

The slot CSMA method disclosed in Patent Literature 1 is a method regarding the use of a single frequency channel (hereinafter referred to as "single channel"), and Patent Literature 1 does not disclose a case where the slot CSMA method is developed to be applied to a plurality of frequency channels (hereinafter referred to as "multi-channels"). Developing the single-channel slot CSMA method to be applied to multi-channels may cause the following drawbacks.

For example, when a large number of active tags as terminals exist in a communication area, and a base station that manages the information of the active tags performs authentication with the active tags within a time slot of a predetermined period, it is essential to reliably perform the authentication within the predetermined period. In order to simultaneously authenticate a large number of active electron tags by using multi-channels, it is necessary to efficiently assign frequency channels and slots to the active tags with priorities being given to the respective active tags. In the single-channel slot CSMA method, if the channel being used continues to be busy due to an interference or the like, it may take time before authentication succeeds, and authentication may not be completed within the predetermined period.

More specifically, when the single-channel slot CSMA method as the conventional art is developed to be applied to multi-channels, if a terminal having a short time limit to authentication selects a channel at random and tries authentication again, this terminal selects a channel without considering the quality of the channel and the priority of the terminal. In this case, the timing at which this terminal starts authentication may be delayed, which may cause a problem that authentication is not completed within the predetermined period.

When it is assumed that a large number of terminals move along a certain direction as shown in FIG. 1, the terminals enter a communication area of a base station from the outside and soon go out of the communication area. In FIG. 1, the terminals move from the left side to the right side. For example, in a system where a control terminal as a base station is set on a school gate and the control terminal authenticates terminals carried by individual students to detect passages of the students, the students pass through the school gate rapidly. In such a case, if authentication takes time, some terminals may pass through the gate without being authenticated, and the students carrying the unauthenticated terminals may fail to be detected.

Further, in the data communication using a plurality of channels simultaneously which is disclosed in Patent Literature 2, communication is performed with channels of high communication qualities selected according to the communication link conditions such as the received signal strength, bit error rate, and packet error rate. However, Patent Literature 2 fails to disclose channel selection considering the priorities of terminals, such as a terminal needing urgent authentication.

It is an object of the present invention to provide a base station and a communication method to be used in a communication network, which control retransmission channels, retransmission timings, and the like, and consider the priorities of terminals, such as a terminal needing urgent authentication, thereby to reduce failures in authentication of the terminals passing through the communication area.

Solution to the Problems

To achieve the above objects, the present invention has the following aspects.

According to an aspect of the present invention, a base station includes: an estimation section that estimates a transmission condition of each frequency channel among a plurality of frequency channels to be used for communication; a reception section that receives a data signal which has been transmitted from each of a plurality of communication terminals through any frequency channel among the plurality of frequency channels; a measurement section that measures a received signal power of the received data signal for each of the frequency channels; a determination section that determines, for each of the frequency channels, whether or not the received data signal has been demodulated without error; and a control section that assigns frequency channels estimated as being in good transmission condition by the estimation section, to communication terminals the data signals of which are determined as not having been demodulated without error by the determination section, in such a manner that a frequency channel being in a better transmission condition is assigned preferentially to a communication terminal having a larger received signal power detected by the detection section, and transmits retransmission request signals that request the communication terminals to retransmit the data signals using the assigned frequency channels.

Further, when a communication terminal, the received signal power of which has been measured two or more times by the detection section, a most-recently measured received signal power being degraded relative to a previously-measured received signal power, is detected among the communication terminals the data signals of which are determined as not having been demodulated without error by the determination section of the base station of the present invention, the control section assigns a frequency channel estimated as being in a better transmission condition by the estimation section preferentially to this communication terminal, and transmits a retransmission request signal that requests this communication terminal to retransmit the data signal using the assigned frequency channel.

Further, the estimation section of the base station of the present invention calculates a success probability of communication in each frequency channel for a predetermined period of time up until the present time, based on a determination result of the determination section, and determines that a frequency channel having a higher communication success probability is a channel in a better transmission condition.

Still further, when the estimation section of the base station of the present invention calculates the success probability, the estimation section applies a weight to a determination result of the determination section according to the received signal power measured in the measurement section, and when the determination result is that the data signal has been demodulated without error, the estimation section increases the weight in such a manner that the smaller the received signal power is, the larger a weighting factor is set.

Still further, when the estimation section of the base station of the present invention calculates the success probability, the estimation section applies a weight to a determination result of the determination section according to the time at which the data signal was received, and increases the weight in such a manner that the later the time at which the data signal was received is, the larger a weighting factor is set.

Yet further, a base station of the present invention includes: a reception section that receives data signals which have been transmitted from a plurality of communication terminals through a predetermined frequency channel; a measurement section that measures a received signal power of the received data signal for each of the communication terminals; a determination section that determines, for each of the transmission terminals, whether or not the received data signal has been demodulated without error; and a control section that assigns retransmission intervals to communication terminals the data signals of which are determined as not having been demodulated without error by the determination section, in such a manner that a shorter transmission interval is assigned preferentially to a communication terminal having a larger received signal power detected by the detection section, and transmits a retransmission request signal that requests this communication terminal to retransmit the data signal using the assigned retransmission interval.

Yet further, when a communication terminal, the received signal power of which has been measured two or more times by the detection section, a most-recently measured received signal power being degraded relative to a previously-measured received signal power, is detected among the communication terminals the data signals of which are determined as not having been demodulated without error by the determination section, the control section of the base station of the present invention assigns a shorter retransmission interval preferentially to this communication terminal over a communication terminal having a largest received signal power, preferentially to this communication terminal over a communication terminal having a large received signal power, and transmits a retransmission request signal that requests this communication terminal to retransmit the data signal using the assigned retransmission interval.

According to another aspect of the present invention, a communication method includes: an estimation step of estimating a transmission condition of each frequency channel among a plurality of frequency channels to be used for communication; a reception step of receiving a data signal which has been transmitted from each of a plurality of communication terminals through any frequency channel among the plurality of frequency channels; a measurement step of measuring a received signal power of the received data signal for each of the frequency channels; a determination step of determining, for each of the frequency channels, whether or not the received data signal has been demodulated without error; and a control step of assigning frequency channels estimated as being in good transmission condition in the estimation step, to communication terminals the data signals of which are determined as not having been demodulated without error in the determination step, in such a manner that a frequency channel being in a better transmission condition is assigned preferentially to a communication terminal having a larger received signal power detected in the detection step, and transmitting retransmission request signals that request the communication terminals to retransmit the data signals using the assigned frequency channels.

Alternatively, a communication method of the present invention includes: a reception step of receiving data signals which have been transmitted from a plurality of communication terminals through a predetermined frequency channel; a measurement step of measuring a received signal power of the received data signal for each of the communication terminals; a determination step of determining, for each of the transmission terminals, whether or not the received data signal has been demodulated without error; and a control step of assigning retransmission intervals to communication terminals the data signals of which are determined as not having been demodulated without error in the determination step, in such a manner that a shorter transmission interval is assigned preferentially to a communication terminal having a larger received signal power detected in the detection step, and transmitting a retransmission request signal that requests this communication terminal to retransmit the data signal using the assigned retransmission interval.

According to still another aspect of the present invention, a communication program that is stored in a computer-readable recording medium and is executed by a communication device operating as a base station in a network system, includes: an estimation step of estimating a transmission condition of each frequency channel among a plurality of frequency channels to be used for communication; a reception step of receiving a data signal which has been transmitted from each of a plurality of communication terminals through any frequency channel among the plurality of frequency channels; a measurement step of measuring a received signal power of the received data signal for each of the frequency channels; a determination step of determining, for each of the frequency channels, whether or not the received data signal has been demodulated without error; and a control step of assigning frequency channels estimated as being in good transmission condition in the estimation step, to communication terminals the data signals of which are determined as not having been demodulated without error in the determination step, in such a manner that a frequency channel being in a better transmission condition is assigned preferentially to a communication terminal having a larger received signal power detected in the detection step, and transmitting retransmission request signals that request the communication terminals to retransmit the data signals using the assigned frequency channels.

Alternatively, a communication program of the present invention includes: a reception step of receiving data signals which have been transmitted from a plurality of communication terminals through a predetermined frequency channel; a measurement step of measuring a received signal power of the received data signal for each of the communication terminals; a determination step of determining, for each of the transmission terminals, whether or not the received data signal has been demodulated without error; and a control step of assigning retransmission intervals to communication terminals the data signals of which are determined as not having been demodulated without error in the determination step, in such a manner that a shorter transmission interval is assigned preferentially to a communication terminal having a larger received signal power detected in the detection step, and transmitting a retransmission request signal that requests this communication terminal to retransmit the data signal using the assigned retransmission interval.

According to yet another aspect of the present invention, an integrated circuit includes: an estimation section that estimates a transmission condition of each frequency channel among a plurality of frequency channels to be used for communication; a reception section that receives a data signal which has been transmitted from each of a plurality of communication terminals through any frequency channel among the plurality of frequency channels; a measurement section that measures a received signal power of the received data signal for each of the frequency channels; a determination section that determines, for each of the frequency channels, whether or not the received data signal has been demodulated without error; and a control section that assigns frequency channels estimated as being in good transmission condition by the estimation section, to communication terminals the data signals of which are determined as not having been demodulated without error by the determination section, in such a manner that a frequency channel being in a better transmission condition is assigned preferentially to a communication terminal having a larger received signal power detected by the detection section, and transmits retransmission request signals that request the communication terminals to retransmit the data signals using the assigned frequency channels.

Alternatively, an integrated circuit of the present invention includes: a reception section that receives data signals which have been transmitted from a plurality of communication terminals through a predetermined frequency channel; a measurement section that measures a received signal power of the received data signal for each of the communication terminals; a determination section that determines, for each of the transmission terminals, whether or not the received data signal has been demodulated without error; and a control section that assigns retransmission intervals to communication terminals the data signals of which are determined as not having been demodulated without error by the determination section, in such a manner that a shorter transmission interval is assigned preferentially to a communication terminal having a larger received signal power detected by the detection section, and transmits a retransmission request signal that requests this communication terminal to retransmit the data signal using the assigned retransmission interval.

According to yet another aspect of the present invention, a network system comprises a plurality of communication terminals and a base station that communicates with the plurality of communication terminals, and the base station includes: an estimation section that estimates a transmission condition of each frequency channel among a plurality of frequency channels to be used for communication; a reception section that receives a data signal which has been transmitted from each of a plurality of communication terminals through any frequency channel among the plurality of frequency channels; a measurement section that measures a received signal power of the received data signal for each of the frequency channels; a determination section that determines, for each of the frequency channels, whether or not the received data signal has been demodulated without error; and a control section that assigns frequency channels estimated as being in good transmission condition by the estimation section, to communication terminals the data signals of which are determined as not having been demodulated without error by the determination section, in such a manner that a frequency channel being in a better transmission condition is assigned preferentially to a communication terminal having a larger received signal power detected by the detection section, and transmits retransmission request signals that request the communication terminals to retransmit the data signals using the assigned frequency channels.

Alternatively, a network system of the present invention comprises a plurality of communication terminals and a base station that communicates with the plurality of communication terminals, and the base station includes: a reception section that receives data signals which have been transmitted from a plurality of communication terminals through a predetermined frequency channel; a measurement section that measures a received signal power of the received data signal for each of the communication terminals; a determination section that determines, for each of the transmission terminals, whether or not the received data signal has been demodulated without error; and a control section that assigns retransmission intervals to communication terminals the data signals of which are determined as not having been demodulated without error by the determination section, in such a manner that a shorter transmission interval is assigned preferentially to a communication terminal having a larger received signal power detected by the detection section, and transmits a retransmission request signal that requests this communication terminal to retransmit the data signal using the assigned retransmission interval.

Effect of the Invention

According to the present invention, even when a large number of terminals pass through the communication area in a short time, the base station can enhance the reliability of completing authentication before the terminals go out of the communication area.

BRIEF DESCRIPTION OF THE DRAWINGS

FIG. 9 is a diagram illustrating updating of an RSSI table according to the first embodiment of the present invention.

FIG. 10 is a diagram illustrating an example of a procedure up to formation of a channel quality table according to the first embodiment of the present invention.

FIG. 11 is a diagram illustrating an example of a retransmission table according to the first embodiment of the present invention.

FIG. 15 is a diagram illustrating updating of an RSSI table according to a second embodiment of the present invention.

FIG. 16 is a diagram illustrating an example of a retransmission table according to the second embodiment of the present invention.

FIG. 17 is a diagram illustrating an example of data transmission/reception by the wireless communication system disclosed in Patent Literature 1.

BEST MODE FOR CARRYING OUT THE INVENTION

Embodiment 1

Figure 1:
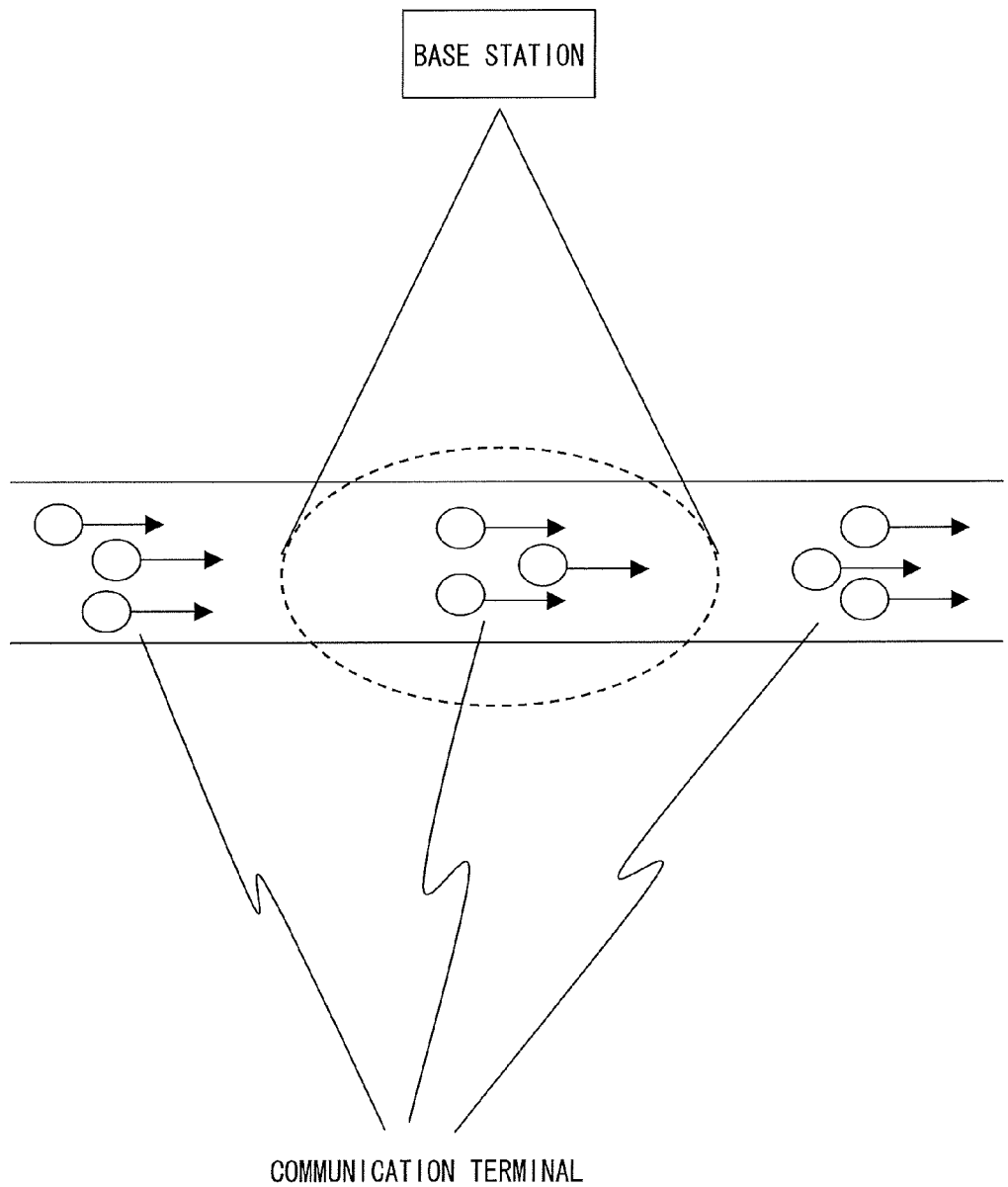
FIG. 1 is a schematic diagram illustrating an application of the present invention.
Figure 2:
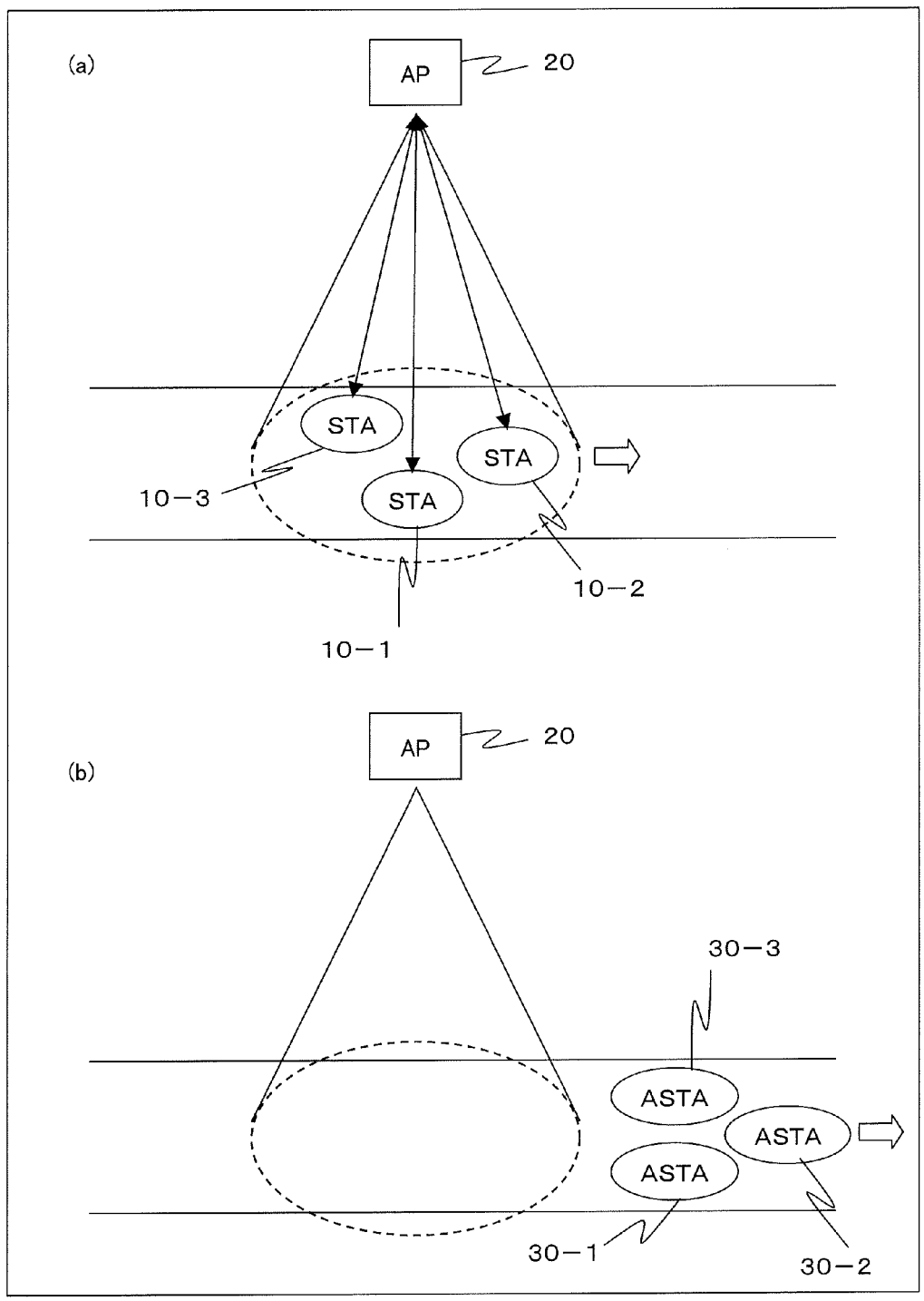
FIG. 2 is a network configuration diagram according to a first embodiment of the present invention.

Hereinafter, a first embodiment of the present invention will be described. FIG. 2 is a network diagram illustrating a network including a base station and communication terminals according to this embodiment. FIG. 2 shows an example of a network configuration utilizing multi-channels. With reference to (a) of FIG. 2, in a communication area of a control terminal AP 20 as a base station, communication terminals STA10-1, 10-2, and 10-3 use different channels CH1 to CH3, respectively, and the AP 20 receives data transmitted from the terminals STA10-1 to 10-3 to perform authentication. With reference to (b) of FIG. 2, the terminals STA10-1 to 10-3 that have performed authentication with the AP 20 become authenticated communication terminals ASTA30-1 to 30-3, respectively, and go out of the communication area of the AP 20.

Figure 3:
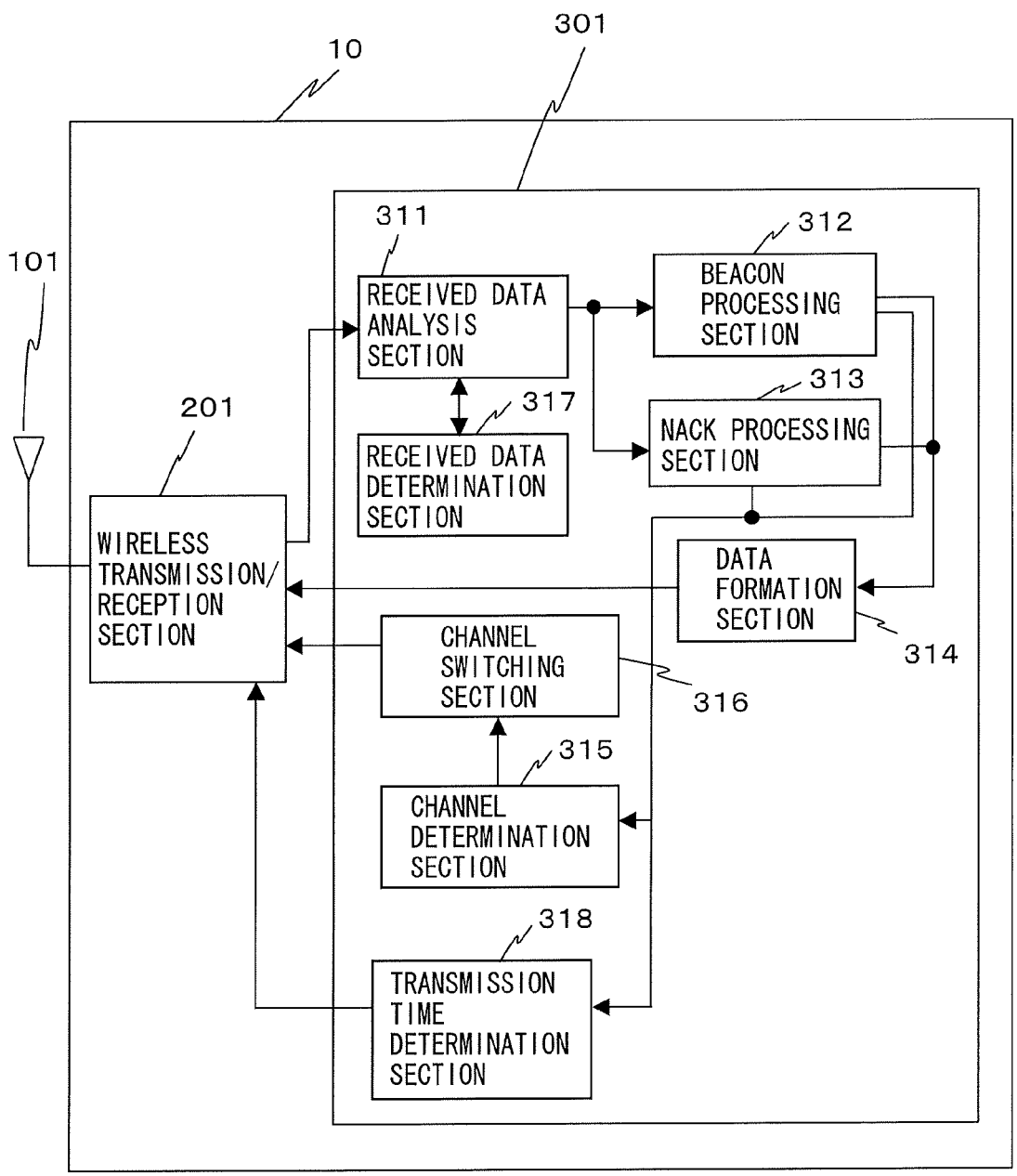
FIG. 3 is a functional block diagram illustrating a communication terminal STA according to the first embodiment of the present invention.

FIG. 3 is a functional block diagram illustrating a communication terminal STA10 used in this embodiment. The terminal STA10 includes an antenna 101, a wireless transmission/reception section 201, and a control section 301. The control section 301 includes a received data analysis section 311, a beacon processing section 312, a NACK (Negative Acknowledgment) processing section 313, a data formation section 314, a channel determination section 315, a channel switching section 316, a received data determination section 317, and a transmission time determination section 318. Transmission data generated in the control section 301 is converted to a transmission signal and to a wireless signal in this order by the wireless transmission/reception section 201, and the wireless signal is transmitted through the antenna 101. On the other hand, a wireless signal received through the antenna 101 is converted to a received signal and to received data in this order by the wireless transmission/reception section 201, and the received data is input to the control section 301.

Figure 4:
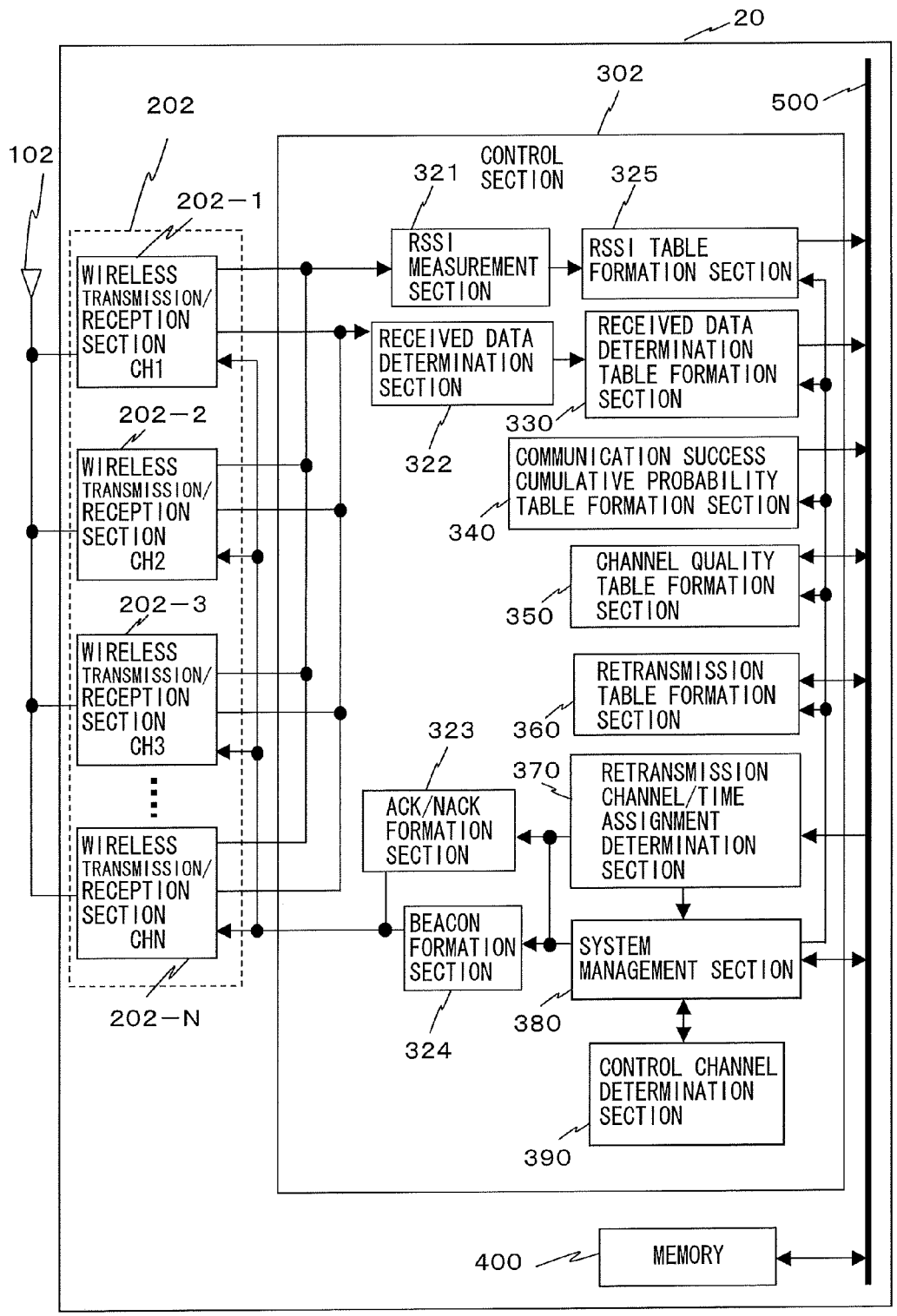
FIG. 4 is a functional block diagram illustrating a control terminal AP according to the first embodiment of the present invention.

FIG. 4 is a functional block diagram illustrating the control terminal AP 20 used in this embodiment. Reference numeral 102 denotes an antenna. Wireless transmission/reception sections 202-1 to 202-N demodulate data received from the wireless network, and modulate data to be transmitted to the wireless network, for the respective channels CH1 to CHN. A wireless transmission/reception section 202 of the AP 20 includes the wireless transmission/reception sections 202-1 to 202-N. The AP 20 includes an RSSI measurement section 321, a received data determination section 322 that determines whether or not the received data has been normally received, an ACK/NACK formation section 323, a beacon formation section 324, an RSSI table formation section 325 that forms an RSSI table which stores measured RSSIs of the data received from the respective terminals STA10 by using the channels CH1 to CHN, a received data determination table formation section 330 that forms received data determination tables for the channels CH1 to CHN, based on the result obtained in the received data determination section 322, a communication success cumulative probability table formation section 340 that forms a communication success cumulative probability table, a channel quality table formation section 350, a retransmission table formation section 360, a retransmission channel/time assignment determination section 370, a system management section 380, and a control channel determination section 390. These function blocks form a control section 302. Reference numeral 400 denotes a memory, and reference numeral 500 denotes a bus.

Figure 5:
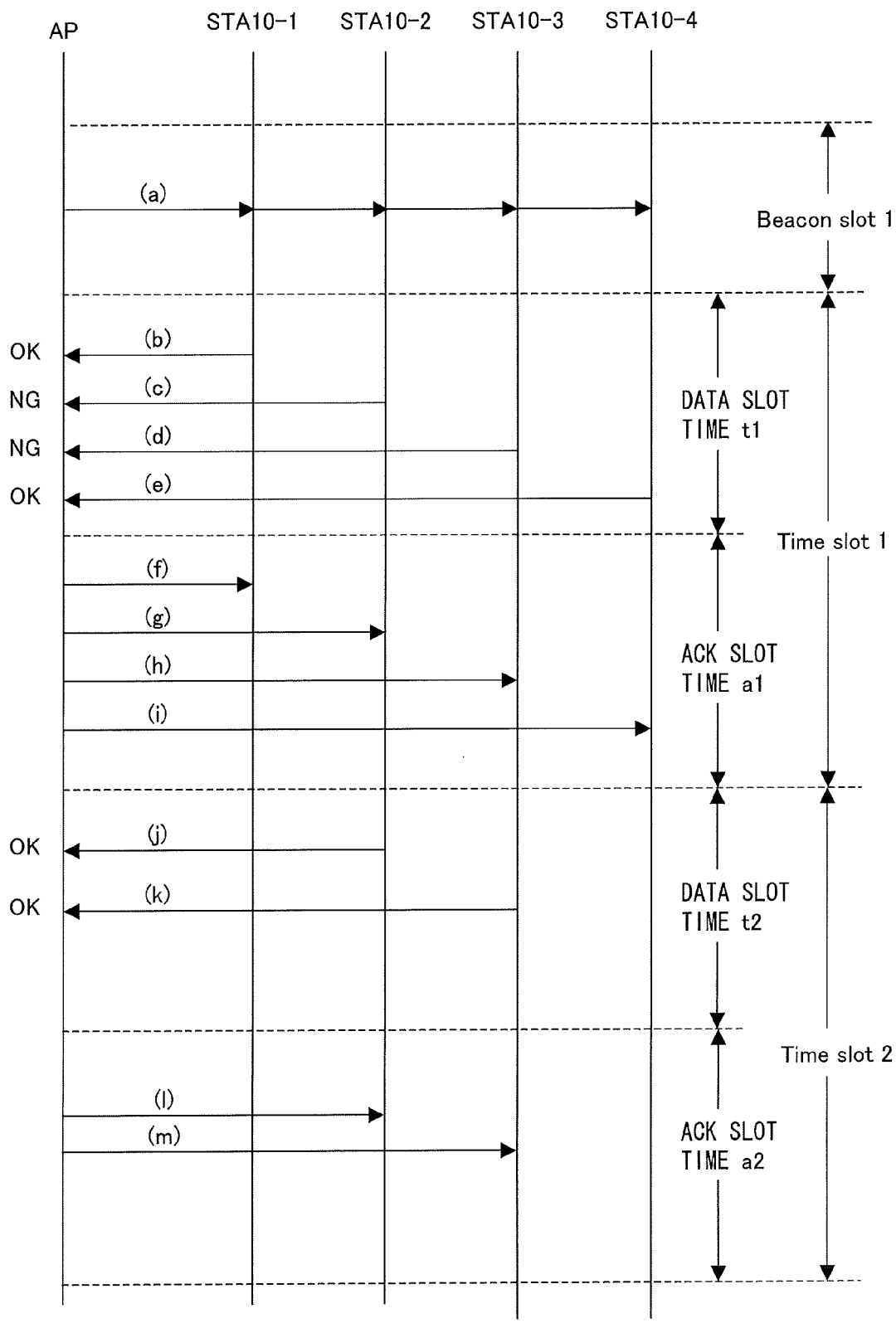
FIG. 5 is a sequence diagram illustrating authentication of terminals according to the first embodiment of the present invention.
Figure 6:
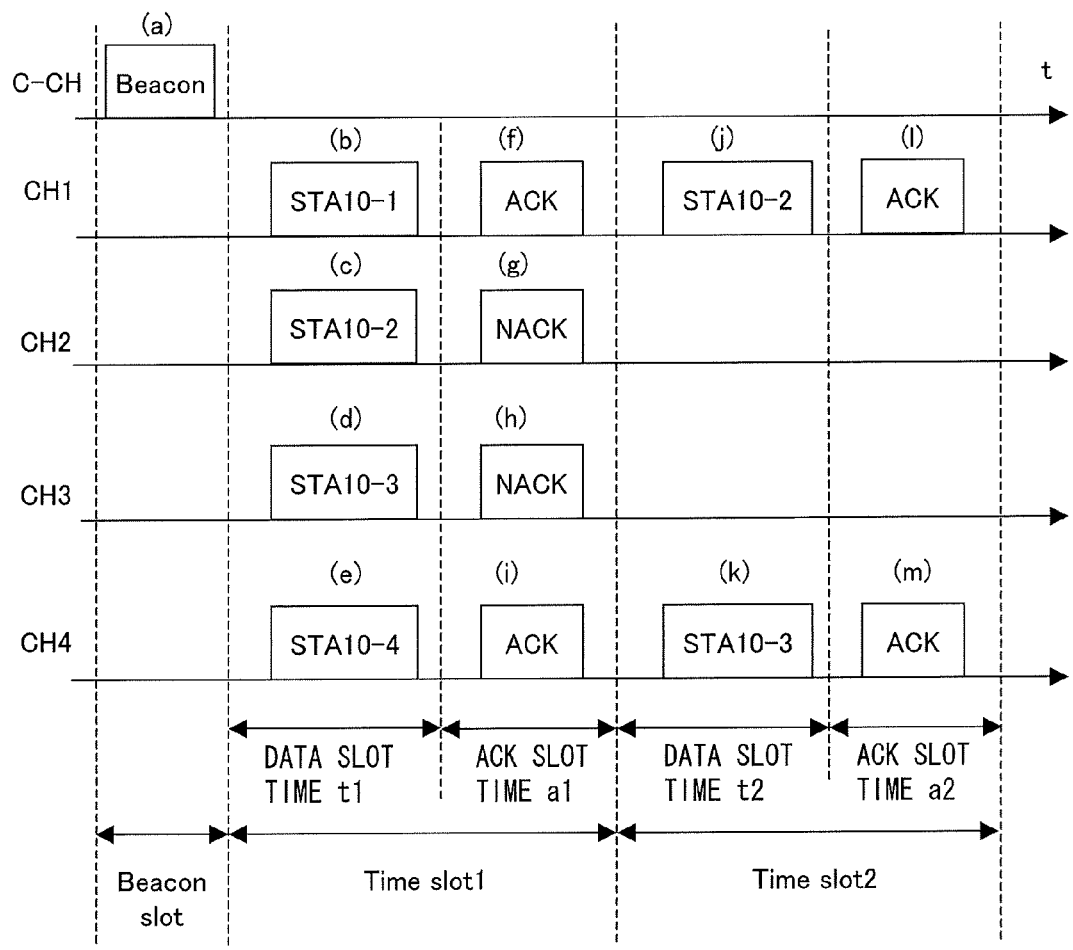
FIG. 6 is a sequence diagram illustrating authentication of terminals according to the first embodiment of the present invention.

Hereinafter, the processes of the respective function blocks shown in FIG. 3 and FIG. 4 will be described with reference to FIG. 5 and FIG. 6, respectively. FIG. 5 and FIG. 6 show examples of data transmission/reception to be performed by the AP 20 and the terminal STA10 of this embodiment, respectively, and a multi-channel slot CSMA method is adopted. To be specific, transmission of a beacon is conducted in a beacon slot, and one time slot includes a data slot time for data transmission/reception and an ACK slot time for confirmation of data reception. In the examples shown in FIG. 5 and FIG. 6, four terminals STA10-1 to 10-4 transmit/receive data to/from an AP 20. FIG. 6 shows a data sequence in which a data sequence of FIG. 5 is viewed in chronological order.

<Operation During Beacon Slot>

The process of the AP 20 in the beacon slot will be described hereinafter. When transmitting a beacon using a control channel (hereinafter referred to as "C-CH"), initially the system management section 380 in the AP 20 holds frequency channel information of a control channel C-CH to be used for transmission of a beacon, the control channel being determined by the control channel determination section 390 at the time of power-on. The beacon transmission may be performed using all the channels instead of using a specific channel such as the control channel C-CH.

When a beacon slot time for transmitting a beacon comes, the system management section 380 instructs the beacon formation section 324 to form a beacon. On receipt of the beacon formation instruction from the system management section 380, the beacon formation section 324 acquires, from the system management section 380, information about the current C-CH, information about the beacon period, the number of slots, and information about the slot time, and forms a beacon including the acquired information, and then transfers the beacon to the wireless transmission/reception section 202 in the AP 20. A wireless transmission/reception section corresponding to the control channel is selected from among the wireless transmission/reception sections 202-1 to 202-N in the wireless transmission/reception section 202. The selected wireless transmission/reception section modulates the beacon, and transmits data of the modulated beacon through the antenna 102 to the wireless network (see (a) of FIG. 5 and (a) of FIG. 6).

Next, the process of the terminal STA10 on reception of the beacon will be described hereinafter. In each of the terminals STA10-1 to 10-4, the data received from the wireless network is demodulated in the wireless transmission/reception section 201, and transferred to the received data analysis section 311.

When the received data is a beacon, the received data analysis section 311 acquires a bit error result of the beacon from the received data determination section 317. If the beacon has a bit error, the beacon is discarded. If the beacon has no bit error, the beacon is transferred to the beacon processing section 312.

The beacon processing section 312 acquires and manages the information included in the beacon. The information included in the beacon is stored in a memory (not shown).

<Operation During Time Slot 1>

[Data Slot Time t1]

The process of the terminal STA10 during a data slot time t1 in a time slot 1 will be described. Data is formed in the data formation section 314 in accordance with the received beacon information, and modulated in the wireless transmission/reception section 201. Thereafter, the data is transmitted through the antenna 101 to the wireless network. At the time of transmission, the terminal STA10 uses the time in the time slot and the channel frequency, which are specified in the received beacon information. Here, the terminals STA10-1 to 10-4 perform data transmission in the data slot time t1 by using the channels CH1 to CH4, respectively (see (b) to (e) of FIG. 5 and (b) to (e) of FIG. 6).

Next, the process of the AP 20 upon reception of the data from the respective terminals STA10 will be described. In the AP 20, the data transmitted from the respective terminals STA10-1 to 10-4 using the respective channels are received by the wireless transmission/reception section 202 through the antenna 102. The wireless transmission/reception sections 202-1 to 202-N demodulate the received data in the respective channels by using methods corresponding to the respective channels. The RSSI measurement section 321 measures RSSIs, based on the signals of the received data. The RSSI table formation section 325 forms an RSSI table, based on the measured RSSI values. The RSSI table, a specific example of which will be described later, is a table that stores the measured RSSIs of the respective terminals STA10, and it is updated every time an RSSI is measured.

The received data determination section 322 determines whether or not the received data has been correctly received. Based on the determination result, the received data determination table formation section 330 forms a received data determination table. The received data determination table, a specific example of which will be described later, is a table that stores whether or not the received data from the respective terminals STA 10 have been correctly received, and it is updated at every determination as to whether or not the received data has been correctly received. The RSSI table and the reception success/fail determination table which are formed by the RSSI table formation section 325 and the received data determination table formation section 330, respectively, are stored in the memory 400 through the bus 500.

The communication success cumulative probability table formation section 340 forms a communication success cumulative probability table, based on the table formed by the received data determination table formation section 330. The communication success cumulative probability table, a specific example of which will be described later, is a table that stores cumulative probabilities that communications using the respective channels have succeeded within the respective time slots, and it is updated for each time slot.

The channel quality table formation section 350 estimates the qualities of the channels, based on the communication success cumulative probability table, to form a channel quality table. The channel quality table, a specific example of which will be described later, is a table that stores the estimated qualities of the respective channels in descending order in each time slot, and it is updated for each time slot.

Figure 7:
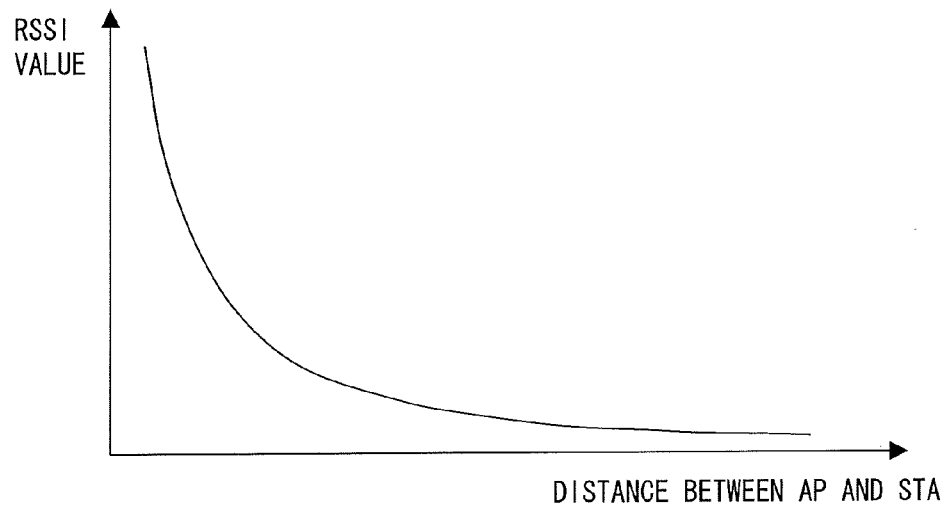
FIG. 7 is a diagram illustrating the relationship between the RSSI value and the distance between a communication terminal STA and a control terminal AP according to the first embodiment of the present invention.

When a terminal STA10 that needs data retransmission exists, the retransmission channel/time assignment determination section 370 estimates the distance between the AP 20 and each terminal STA10 with reference to the RSSI table formed by the RSSI table formation section 325, and performs assignment of a channel and a time to be used for retransmission in accordance with the channel quality table. Generally, the transmission signal level of each terminal STA10 has less variation. Since the measured RSSI value of each terminal STA10 varies depending mainly on the distance between the AP 20 and the terminal STA10, the distance between the AP 20 and the terminal STA10 can be estimated based on the RSSI value. FIG. 7 shows the relationship between the RSSI value and the distance between the AP 20 and the terminal STA10.

The retransmission table formation section 360 forms a retransmission table, based on the information determined by the retransmission channel/time assignment determination section 370. The retransmission table, a specific example of which will be described later, is formed when a terminal STA10 needing data retransmission exists, and it stores a retransmission channel and a retransmission time to be assigned to this terminal STA10. The information of the retransmission table thus formed is transferred from the memory to the system management section 380.

The system management section 380 instructs the ACK/NACK formation section 323 to form ACKs for terminals STA10 that have succeeded in data reception (STA10-1 and STA10-4). On the other hand, it instructs the ACK/NACK formation section 323 to form NACKs for terminals STA10 that have failed in data reception (STA10-2 and STA10-3). At this time, information about retransmission channels and retransmission times to be used when the terminals STA10 perform retransmission is stored in the respective NACKs, based on the retransmission table formed by the retransmission table formation section 360.

[ACK Slot Time a1]

Next, the processes of the AP 20 and the terminals STA10 in an ACK slot time a1 in the time slot 1 will be described. In the ACK slot time a1, the AP 20 transmits ACKs to the terminals STA10-1 and STA10-4 that have succeeded in data reception (see (f), (i) of FIG. 5 and (f), (i) of FIG. 6). On the other hand, the AP 20 transmits NACKs including the data slot times and the channel information to be used for retransmission, to the terminals STA10-2 and STA10-3 which have failed in data reception (see (g), (h) of FIG. 5 and (g), (h) of FIG. 6). It is assumed that the NACKs include information that the channels CH1 and CH4 and the data slot time t2 are specified for the terminals STA10-2 and STA10-3, respectively.

Each of the terminals STA10-2 and STA10-3 receives the NACK from the AP 20, demodulates the NACK by the wireless transmission/reception section 201, and transfers the demodulated NACK data to the received data analysis section 311.

The received data analysis section 311 transfers the data to the NACK processing section 313 because the received data is the NACK. The NACK processing section 313 acquires and manages the information included in the NACK. The information included in the NACK is stored in the memory (not shown).

<Operation During Time Slot 2>

[Data Slot Time t2]

Next, the process of the terminal STA10 in a data slot time t2 in a time slot 2 will be described. In the terminal STA10 which has received the NACK, the data formation section 314 forms retransmission data, based on the information included in the NACK. The retransmission data is modulated by the wireless transmission/reception section 201, and transmitted through the antenna 101 to the AP 20. The channel determination section 315 and the transmission time determination section 318 determine a channel and a time to be used for transmission, based on the NACK information, respectively, and set the determined channel and time to the wireless transmission/reception section 201.

Since the terminals STA10-2 and STA10-3 have received the NACKs, these terminals perform data retransmission using the channels CH1 and CH4, based on the NACK information, respectively (see (j), (k) of FIG. 5 and (j), (k) of FIG. 6). The retransmission data transmitted from the terminals STA10-2 and STA10-3 are received by the AP 20. Since the process in the AP 20 is similar to the process in the data slot time t1, description thereof will be omitted.

[ACK Slot Time a2]

Next, the process of the AP 20 in an ACK slot time a2 in the time slot 2 will be described. Since the AP 20 has succeeded to receive the retransmission data from the terminals STA10-2 and STA10-3, the ACK/NACK formation section 323 forms ACKs. The AP 20 transfers the ACKs to the terminals STA10-2 and STA10-3 (see (l), (m) of FIG. 5 and (l), (m) of FIG. 6). Thus, the data sequence is completed.

Hereinafter, the process flow in the AP 20 from the data slot time to the ACK slot time, and updating of the respective tables will be described using an example with reference to FIG. 8 to FIG. 12. In this example, it is assumed that ten terminals STA10-1 to 10-10 exist in the communication area of the AP 20.

Figure 8:
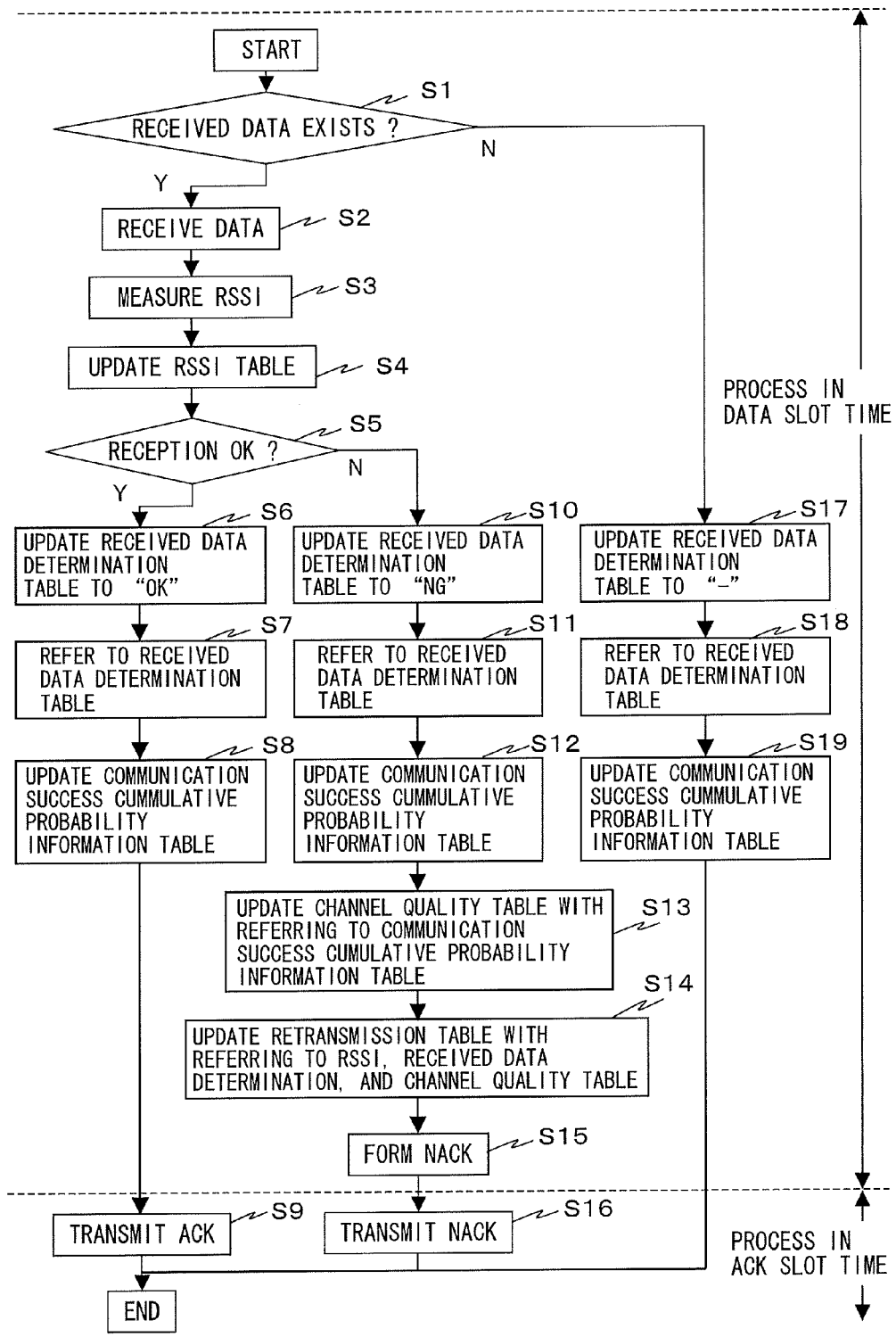
FIG. 8 is a flowchart of the control terminal AP according to the first embodiment of the present invention.

FIG. 8 is a flowchart of the AP 20 used for the first embodiment of the present invention. FIG. 8 is common to the channels CH1 to CHN. In the data slot time, the AP 20 confirms whether or not received data from the respective terminals STA10 exist (S1). When the received data exist, the AP 20 receives the data (S2).

Next, the AP 20 measures an RSSI of the received data (S3), and updates the RSSI table shown in FIG. 9 (S4).

FIG. 9 is a diagram illustrating an example of updating of the RSSI table according to the first embodiment of the present invention. When the AP 20 receives the data from the respective terminals STA10 in the data slot time, the AP 20 stores the RSSI table corresponding to the respective terminals STA10, which is formed based on the RSSIs measured in the RSSI measurement section 321, in the memory. Since each terminal STA10 moves, the distance from the AP 20 varies, and the RSSI also varies. In order to deal with such variations of the RSSIs, the RSSI table is updated within the data slot time. For example, (a) of FIG. 9 shows the RSSI table in the data slot time t1, and (b) of FIG. 9 shows the RSSI table in the data slot time t2. As shown in (a) and (b) of FIG. 9, the RSSI table is updated for every data slot time.

Next, it is determined whether or not the data received by the AP 20 have been correctly received (S5). When the AP 20 has correctly received data from any terminal STA10, "o" (OK) is entered in the received data determination table shown in (a) of FIG. 10 to update the received data determination table (S6). For example, in the data slot time t1 shown in (a) of FIG. 10, the data transmitted from the terminal STA10 using the channel CH1 has been correctly received by the AP 20, hence "o" is entered.

Next, the communication success cumulative probability information table shown in (b) of FIG. 10 is updated (S8) with reference to the received data determination table shown in (a) of FIG. 10 (S7). In (b) of FIG. 10, the communication success cumulative probability information table is updated based on a plurality of reception success/fail information obtained in the past, with reference to the received data determination table shown in (a) of FIG. 10. The number of the communication success cumulative probabilities to be calculated is determined by the system management section 380.

For example, in the data slot time t3 shown in (b) of FIG. 10, when the results on the received data determination table for three time slots in the past are considered, since the channel CH1 has succeeded in three out of three communications, "100%" is entered. In the data slot t3, the channel CH2 has succeeded in one out of two communications, hence "50%" is entered; the channel CH3 has succeeded in three out of three communications like the channel CH1, hence "100%" is entered; the channel CH4 has succeeded in one out of three communications, hence "33%" is entered. The communication success cumulative probability information table shown in (b) of FIG. 10 is updated for every data slot time, similarly to the RSSI table.

Next, since the AP 20 has normally completed data reception in the reception determination step S5, it transfers an ACK to the terminal STA10 in the ACK slot time (S9).

In the reception determination step S5, if the received data has not been correctly received, "x" (NG) is entered in the received data determination table shown in (a) of FIG. 10 to update the received data determination table. For example, in the data slot time t1 in (a) of FIG. 10, the data transmitted from the terminal STA10 using the channel CH2 has failed to be received by the AP 20, hence "x" is entered.

Next, the communication success cumulative probability information table shown in (b) of FIG. 10 is updated (S12) with reference to the received data determination table shown in (a) of FIG. 10 (S11). In (b) of FIG. 10, the communication success cumulative probability table is updated based on the reception success/fail information obtained in plural communications in the past, with reference to the received data determination table shown in (a) of FIG. 10.

Next, the channel quality table shown in (c) of FIG. 10 is updated with reference to the communication success cumulative information table updated in step 12 (S13).

In (c) of FIG. 10, the channels are sorted into high-quality channels and low-quality channels, based on the communication success cumulative probability information table shown in (b) of FIG. 10. For example, assuming that the cumulative probabilities are calculated for eight communications performed in the past, in the data slot time t8 shown in (b) of FIG. 10, the channel CH1 having a highest communication success cumulative probability is a channel having a highest quality. On the other hand, since the channel CH4 has a lowest communication success cumulative probability, it is a channel of a lowest quality.

Figures 13, 14:
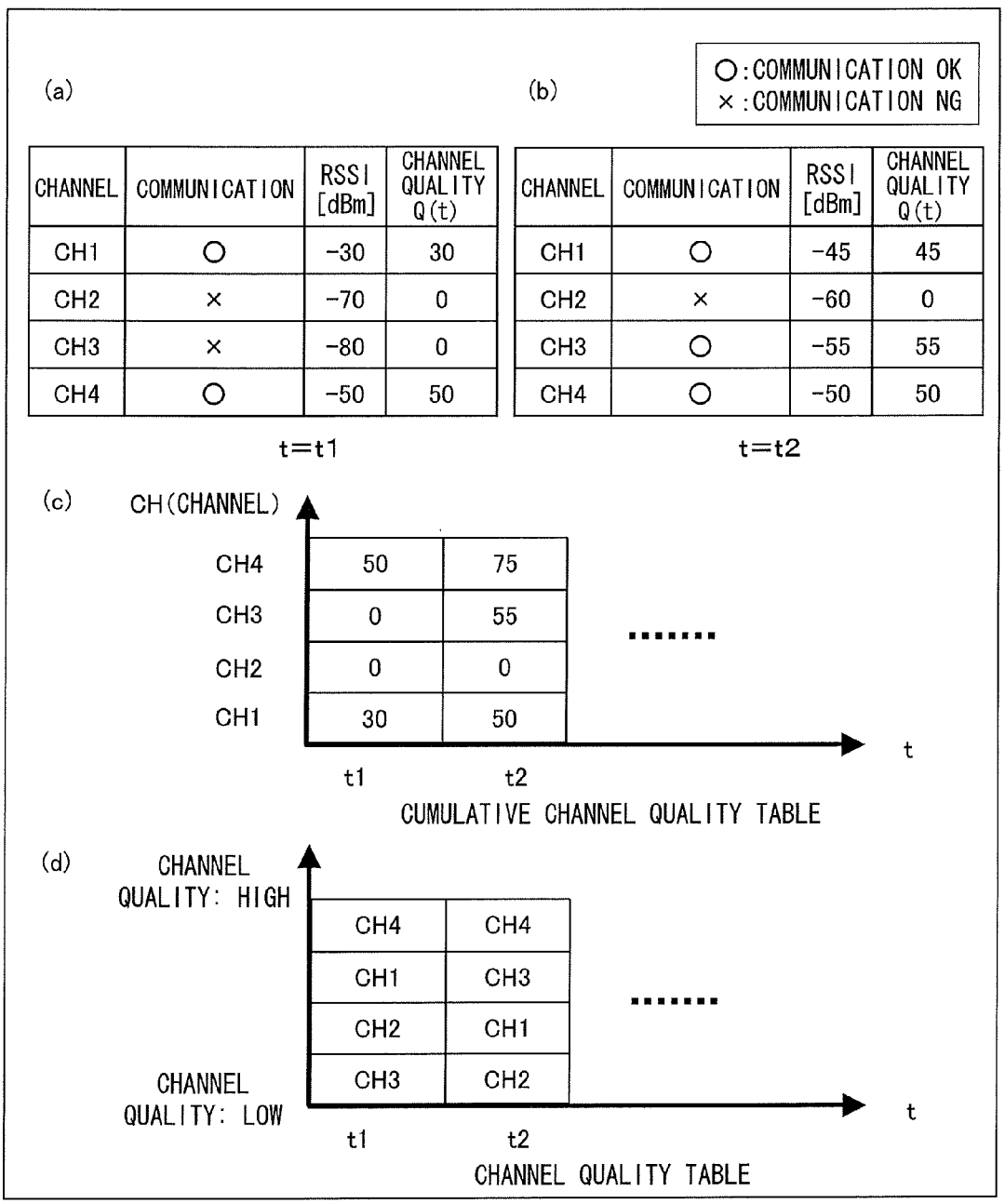
FIG. 13 is a diagram illustrating an example of a NACK frame format according to the first embodiment of the present invention.
FIG. 14 is a diagram illustrating an example of a procedure up to formation of the channel quality table according to the first embodiment of the present invention.

Next, the retransmission table shown in FIG. 11 is updated with reference to the RSSI table updated in step 4, the received data determination table updated in step 10, and the channel quality table updated in step 13 (S14). FIG. 13 shows a retransmission table including channel information and data slot time information to be used for retransmission, which table is to be given to the terminal STA10.

The AP 20 forms a NACK, based on the retransmission table updated in step 14 (S15), and transmits the NACK to the terminal STA10 (S16).

FIG. 13 shows an example of a NACK frame format, wherein DA denotes a destination address, SA denotes a source address, CH denotes a specified retransmission channel that shows a channel to be used for retransmission, Time denotes a specified retransmission time lot that shows a time slot to be used for retransmission, and CRC (Cyclic Redundancy Check) denotes cyclic redundancy check information that is information for error detection.

In step 1 for determining whether or not received data exist in the data slot time, if any of the received data has not been correctly received "-" is entered in the received data determination table shown in (a) of FIG. 10 to update the table. For example, since no received data exists in the channel CH2 in the data slot time t3 shown in (a) of FIG. 10, "-" is entered.

Next, a manner of assigning channels and times to the respective terminals STA10 when retransmission occurs will be described with reference to FIG. 11 and FIG. 12.

FIG. 11 shows an example of updating of the retransmission table in the data slot time t1. Further, FIG. 12 shows the priorities of the terminals STA10, and a manner of assigning channels and times to the terminals STAR).

The retransmission table shown in FIG. 11 is updated with reference to the RSSI table shown in FIG. 9, the received data determination table shown in (a) of FIG. 10, and the channel quality table shown in (c) of FIG. 10.

In FIG. 11, since the data transmitted from the terminal STA10-1 has been successfully received by the AP, "OK" is entered in the column of reception determination in the retransmission table. Further, since the reception has succeeded, "-" is entered in the columns of retransmission channel and retransmission slot time. On the other hand, since the terminal STA10-2 has failed in communication, "NG" is entered in the column of reception determination in the retransmission table. Accordingly, in order to request retransmission from the terminal STA10-2, a channel and a slot time for retransmission are assigned to this terminal STA in the NACK. In this example, the channel CH1 having a highest channel quality in the data slot time t1, and the data slot time t2 in the next time slot are assigned to the terminal STA10-2 having a largest RSSI value among the terminals STA. On the other hand, since the terminal STA10-9 having a smallest RSSI value among the terminals STA has enough time before performing authentication with the AP, the channel CH2 having a lowest channel quality in the data time slot time t1 is assigned to the terminal STA10-9, and further, the time slot time t4 is assigned thereto.

Figure 12:
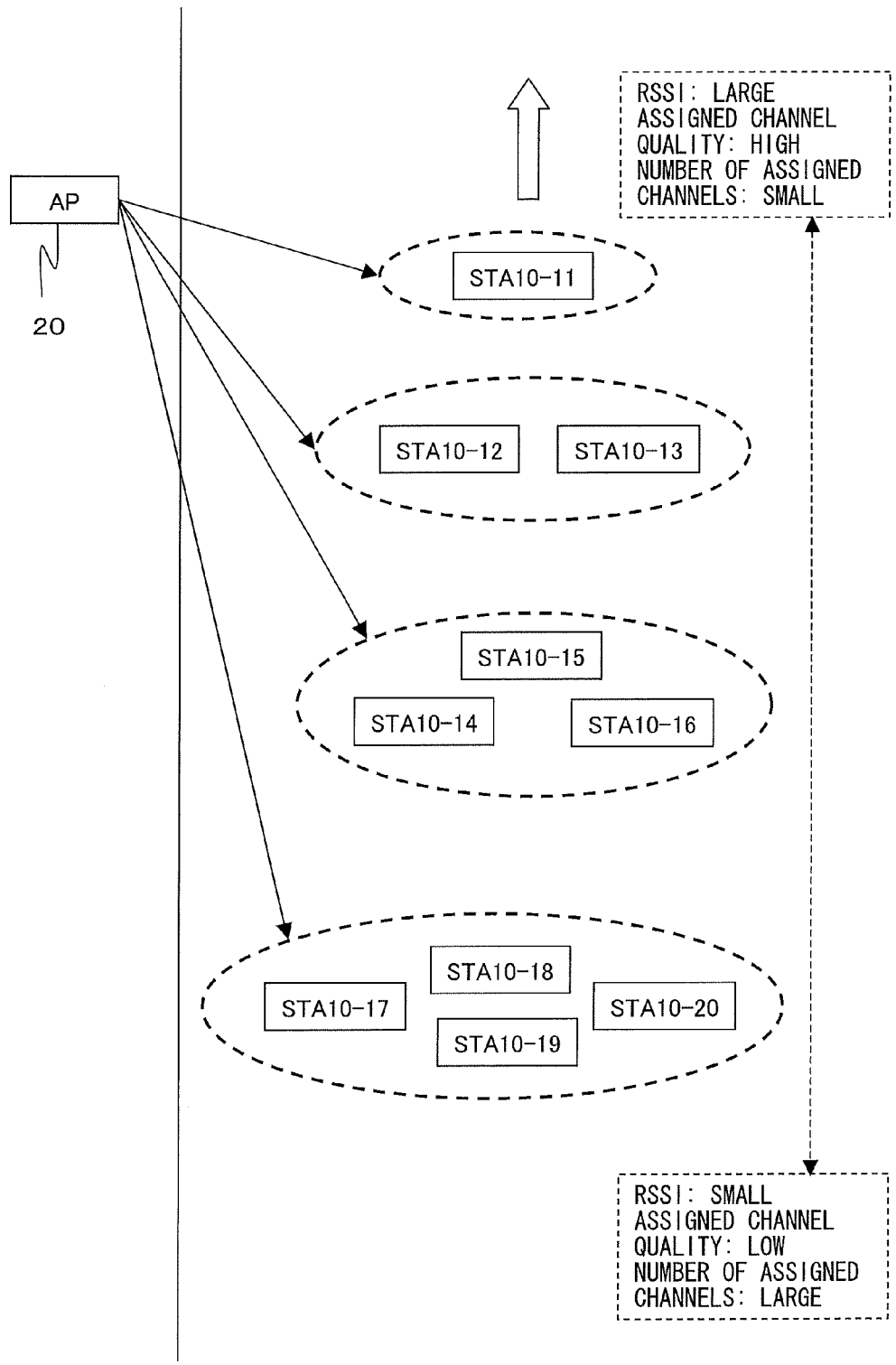
FIG. 12 is a diagram illustrating a manner of determining the priorities of terminals STA and channels according to the first embodiment of the present invention.

FIG. 12 shows an example of a manner of giving the priorities to the terminals STA10. In FIG. 12, it is assumed that the AP 20 successively performs authentication with ten terminals STA10-11 to 10-20. In this example, the terminals STA10-11 to 10-20 move from the bottom of the figure toward the top.

It is assumed that the terminal STA10-11 is nearest to the AP 20, hence having a largest RSSI value. On the other hand, the terminals STA10-17 to STA10-20 are most apart from the AP 20, hence having small RSSI values. Assignment of channels and times is performed in such a manner that, as shown in FIG. 11 and FIG. 12, a channel of a higher quality is assigned to a terminal STA10 that is nearer to the AP 20, i.e., has a larger RSSI, and the number of terminals STA10 to be assigned to this channel is decreased. On the other hand, a channel of a lower quality is assigned to a terminal STA10 that is more apart from the AP 20, i.e., has a smaller RSSI, and the number of terminals STA10 to be assigned to this channel is increased. As described above, the AP 20 instructs the terminal STA10 to perform transmission of a data signal using a channel of a good transmission condition so that the AP 20 and the terminal STA10 can surely perform data exchange before the terminal STA10 moves away from the AP 20, and therefore the AP 20 can receive the data more reliably. Further, the AP 20 gives a retransmission opportunity to the terminal STA10 at an earlier time so that the AP 20 and the terminal STA10 can surely perform data exchange before the terminal STA10 moves away from the AP 20.

Therefore, if the AP 20 has again failed to correctly receive the data transmitted from the terminal STA10, the AP 20 can transmit a signal requesting retransmission while the terminal STA10 is still near the AP20, thereby enhancing the possibility that the AP 20 can correctly receive the data transmitted from the terminal STA10.

The formation section of the channel quality table shown in FIG. 10 may determine the channel qualities according to the procedure shown in FIG. 14. Hereinafter, the procedure for updating the channel quality table will be described with reference to FIG. 14.

(a) of FIG. 14 shows the channel qualities Q(t) of the respective channels in the data slot time t1. The channel qualities Q(t) are determined using, for example, Formula 1.

$$Q(t)=|RSSI(t)| \times Z \qquad \text{[Formula 1]}$$

In Formula 1, Z is a communication factor representing whether or not communication has succeeded or failed. In the example shown in FIG. 14, Z=1 when communication has succeeded, and Z=0 when communication has failed. When communication has failed, since the RSSI is likely to be measured high due to synthesis of a desired signal and an interference wave, the communication factor Z is desired to be 0 in order to make it independent from the channel qualities Q(t). For example, in (a) of FIG. 14, the AP has correctly received the data through the channel CH1, and RSSI(t1)=−30 dBm at that time, hence Q(t1)=|−30|×1=30.

On the other hand, the AP has failed to receive the data transmitted through the channel CH3, hence Q(t1)=0 regardless of the RSSI.

(b) of FIG. 14 shows the channel qualities Q(t) of the respective channels in the data slot time t2. The channel qualities Q(t) of the respective channels are calculated using (formula 1) like in (a) of FIG. 14.

(c) of FIG. 14 illustrates a cumulative channel quality table. A cumulative channel quality Qc(t) is a value obtained by accumulating the channel qualities Q(t) of a certain channel for a predetermined period. The cumulative channel quality Qc(t) is calculated in such a manner that a channel quality at a time closer to the present time is weighted heavier by giving a larger weighting factor thereto. In (c) of FIG. 14, the cumulative channel qualities Qc(t) are calculated based on, for example, Formula 2. In this example, the channel qualities Q(t) at the respective times are given weighting factors 1, 0.5, 0.25 . . . in reverse chronological order, that is, a channel quality at a time closer to the present time is given a larger weighting factor.

$$Q_c(t) = Q(t) + \frac{1}{2}Q(t-1) + \left(\frac{1}{2}\right)^2 Q(t-2) + \dots \qquad \text{[Formula 2]}$$

In (c) of FIG. 14, the cumulative channel quality of the channel CH4 in the data slot time t2 is Qc=(50+(½)×50)=75 according to Formula 2. In this example, two channel qualities obtained in the past are considered. The number of the channel qualities in the past to be accumulated depends on setting of the system management section 380.

In the channel quality table shown in (d) of FIG. 14, the channels are rearranged in descending order of the channel qualities, based on (c) of FIG. 14. Based on this channel quality table, the AP 20 assigns channels and times to be used for retransmission, to terminals STA10 which have failed in communication.

A terminal STA10 that has succeeded in authentication may notify the user who carries this terminal STA10 of the success by making a sound or the like. Alternatively, a terminal STA10 that has failed in authentication may notify the user of the failure by making a sound or the like.

As described above, according to the first embodiment, the base station instructs a communication terminal needing data retransmission to perform data transmission in such a manner that a communication terminal having a larger RSSI performs data retransmission using a frequency channel of a better channel condition. Therefore, the base station can reliably receive a data signal from a communication terminal near the base station before the terminal moves away from the base station.

Further, the base station determines the transmission conditions of the respective frequency channels, based on the success probabilities of communications performed for a predetermined period of time up until the present. Therefore, if a channel is actually in good transmission condition but a data signal just received through this channel is not correctly demodulated, this channel is prevented from being determined as a channel in bad transmission condition, and a frequency channel in good transmission condition can be estimated reliably, thereby increasing the possibility that the data signal transmitted from the communication terminal can be correctly demodulated.

Furthermore, when calculating the success probability, weighting may be conducted according to the RSSI. To be specific, when the determination result is that the data signal has been demodulated without error, weighting may be conducted in such a manner that the smaller the RSSI of the data signal is, the larger a weighting factor is set. In this case, a frequency channel which is used by a communication terminal that is far from the base station and hence is less likely demodulated without error though the condition of the channel is good is prevented from being erroneously determined as being in bad transmission condition, and thereby a frequency channel in good transmission condition can be estimated with higher reliability.

Furthermore, for example, in a frequency channel that has originally been in good condition, if transmission of an interference signal from another system is started at a certain point in time, the condition of this channel might be rapidly deteriorated. In such a case, weighting may be performed in such a manner that the later the time at which the data signal was received is, the larger the weighting factor is set. Thus, when the frequency of occurrence of determination result that the data signal has not been demodulated without error is increased after the condition of the channel is deteriorated, the determination result after the deterioration of the channel condition is considered to be more important than the determination result before the deterioration of the channel condition. Therefore, the base station can sooner determine that the transmission condition of the frequency channel is deteriorated.

Furthermore, the base station gives a retransmission opportunity to a communication terminal needing data retransmission in such a manner that the larger the RSSI is, the sooner the retransmission opportunity is given. Therefore, the base station can reliably receive a data signal from a communication terminal that is near the base station before the terminal moves away from the base station.

Embodiment 2

Hereinafter, a second embodiment of the present invention will be described. In the first embodiment, a channel having a higher quality is assigned to a terminal STA having a larger RSSI value. This second embodiment is different from the first embodiment in that, when a terminal STA10 the latest RSSI value of which is lower than the previously-measured RSSI value is detected, exceptionally a channel of a highest quality is preferentially assigned to this terminal STA10 over a terminal STA10 having a largest RSSI value. This difference will be described hereinafter.

The RSSI table of the first embodiment shown in FIG. 9 is merely overwritten with updated RSSI values every time RSSI measurement is conducted. On the other hand, in the RSSI table of this second embodiment, as shown in FIG. 15, the RSSI values are updated, and moreover, when an updated value is smaller than the previously measured value, a flag indicating this is stored.

In the example shown in FIG. 15, it is assumed that ten terminals STA10-21 to 10-30 exist in the communication area of the AP 20. Comparing the RSSI value at time t0 with the RSSI value at time t1, since only the updated RSSI value of the terminal STA10-23 is lowered, a flag of the terminal STA10-23 is on. This means that the distance between the terminal STA10-23 and the AP 20 is increasing. This means that the terminal STA10-23 failed in authentication although the terminal STA10-23 was preferentially assigned a channel of a highest quality while the distance between the terminal STA10-23 and the AP 20 was short and hence this terminal had a largest RSSI value. Since the terminal STA10-23 is supposed to go out of the communication area of the AP 20 earlier than other terminals STA10, it is required to be authenticated preferentially. In this way, a terminal STA10 for which a flag is on in the RSSI table is assigned a channel of a highest quality, and further, the retransmission interval is reduced. In the case shown in FIG. 15, the terminal STA10-23 is assigned the channel CH1 of a highest quality, and the earliest retransmission data slot time t2, as shown in FIG. 16.

As described above, in this second embodiment, if a communication terminal which is getting apart from the base station without being authenticated is detected, this communication terminal is assigned a higher-quality channel and an earlier retransmission time preferentially over a communication terminal that is closest to the base station, thereby to enable authentication. Thus, a communication terminal that might first go out of the communication area of the base station is prevented from failing in authentication, thereby enhancing the reliability of authentication.

The processes performed by the base station as the control terminal AP 20 according to the respective embodiments of the present invention can be recognized as a communication method that gives a series of process steps. This method may be provided in a form of a program that makes a computer execute the series of process steps. This program may be loaded on a computer in a form recorded on a computer-readable recording medium.

Further, the function blocks included in the base station may be realized as an LSI which is an integrated circuit. These constituents may be integrated in a chip, or some of the function blocks may be integrated in a chip. The LSI mentioned above may be referred to as an IC, a system LSI, a super LSI, or an ultra LSI depending on the degree of integration. The method of integration is not limited to the LSI, and may be realized by using a dedicated circuit or a general-purpose processor. Alternatively, an FPGA (Field Programmable Gate Array) which is programmable after fabrication of an LSI or a reconfigurable processor capable of reconfiguring connections and settings of circuit cells in an LSI may be used. Further, calculations to be performed in these function blocks can be conducted using such as a DSP or a CPU.

Furthermore, these process steps may be performed by recording the same as a program on a recording medium, and executing the program.

Still further, if integration technologies replacing the LSI are developed with the advancement of semiconductor technologies or other technologies derived therefrom, the function blocks may be integrated using such technologies. Biotechnologies and the like may be applied.

INDUSTRIAL APPLICABILITY

A base station and a communication method used for a wireless communication system according to the present invention allow a control terminal to perform data authentication efficiently and reliably with a large number of communication terminals, and are applicable to wireless networks such as a sensor network and an active RF tag system, which include a large number of terminals, and more particularly, to a wireless network in which a large number of terminals passing through in a short time are required to be identified and authenticated rapidly.

DESCRIPTION OF THE REFERENCE CHARACTERS

| | |
|---|---|
| 10 | communication terminal (STA) |
| 20 | control terminal (AP) |
| 30 | authenticated terminal (ASTA) |
| 100, 101, 102 | antenna |
| 150 | wireless station |
| 200, 201, 202 | wireless transmission/reception section |
| 210 | high-frequency section |
| 220 | demodulation section |
| 230 | modulation section |
| 301, 302 | control section |
| 311 | received data analysis section |
| 312 | beacon processing section |
| 313 | NACK processing section |
| 314 | data formation section |
| 315 | channel determination section |
| 316 | channel switching section |
| 317 | received data determination section |
| 318 | transmission time determination section |
| 321 | RSSI measurement section |
| 322 | received data determination section |
| 323 | ACK/NACK formation section |
| 324 | beacon formation section |
| 325 | RSSI table formation section |
| 330 | received data determination table formation section |
| 340 | communication success cumulative probability table formation section |
| 350 | channel quality table formation section |
| 360 | retransmission table formation section |
| 370 | retransmission channel/time assignment determination section |
| 380 | system management section |
| 390 | control channel determination section |
| 400 | memory |
| 500 | bus |
| 1000 | communication terminal (STA) |
| 2000 | control terminal (AP) |

The invention claimed is:

1. A base station including:
   an estimation section that estimates a transmission condition of each frequency channel among a plurality of frequency channels to be used for communication;
   a reception section that receives a data signal which has been transmitted from each of a plurality of communication terminals through any frequency channel among the plurality of frequency channels;

a measurement section that measures a received signal power of the received data signal for each of the communication terminals;

a determination section that determines, for each of the communication terminals, whether or not the received data signal has been demodulated without error; and a control section that (i) assigns data slots times as data retransmission times to communication terminals, of the plurality of communication terminals, of which the received data signals are determined as not having been demodulated without error by the determination section, in such a manner that an earlier data slot time, among data slot times present in a repetitive manner, is assigned preferentially to a communication terminal, of the communication terminals having the data slot times assigned thereto, having a larger received signal power detected by the measurement section, and (ii) transmits a retransmission request signal that requests the communication terminal having the larger received signal power to retransmit the data signal at the data retransmission time assigned to the communication terminal having the larger received signal power, wherein, when assigning a same data retransmission time to two or more of the plurality of communication terminals, the control section assigns frequency channels, estimated as being in good transmission condition by the estimation section, to the two or more of the communication terminals in such a manner that a frequency channel, of the frequency channels estimated as being in good transmission condition, being in a better transmission condition is assigned preferentially to the communication terminal having the larger received signal power detected by the measurement section.

2. The base station according to claim 1, wherein, when a communication terminal, of which the received signal power has been measured two or more times by the measurement section, a most-recently measured received signal power being degraded relative to a previously-measured received signal power, is detected among the communication terminals for which the received data signals are determined as not having been demodulated without error by the determination section, the control section (i) assigns a frequency channel estimated as being in a better transmission condition by the estimation section preferentially to the detected communication terminal, and (ii) transmits a retransmission request signal that requests the detected communication terminal to retransmit the data signal using the assigned frequency channel.

3. The base station according to claim 1, wherein the estimation section calculates a success probability of communication in each frequency channel for a predetermined period of time up until a present time, based on a determination result of the determination section, and determines that a frequency channel having a higher communication success probability is a channel in a better transmission condition.

4. The base station according to claim 3, wherein, when calculating the success probability, the estimation section applies a weight to the determination result of the determination section according to the received signal power measured in the measurement section, and when the determination result is that the data signal has been demodulated without error, the estimation section increases the weight in such a manner that the smaller the received signal power is, the larger a weighting factor is set.

5. The base station according to claim 3, wherein, when calculating the success probability, the estimation section applies a weight to the determination result of the determination section according to a time at which the data signal was received, and increases the weight in such a manner that the later the time at which the data signal was received is, the larger a weighting factor is set.

6. A base station including:

a reception section that receives data signals which have been transmitted from a plurality of communication terminals through a predetermined frequency channel;

a measurement section that measures a received signal power of the received data signal for each of the communication terminals;

a determination section that determines, for each of the communication terminals, whether or not the received data signal has been demodulated without error; and a control section that (i) assigns data slot times as data retransmission times to communication terminals, of the plurality of communication terminals, of which the received data signals are determined as not having been demodulated without error by the determination section, in such a manner that an earlier data slot time, among data slot times present in a repetitive manner, is assigned preferentially to a communication terminal, of the communication terminals having the data slot times assigned thereto, having a larger received signal power detected by the measurement section, and (ii) transmits a retransmission request signal that requests the communication terminal having the larger received signal power to retransmit the data signal at the data retransmission time assigned to the communication terminal having the larger received signal power, wherein, when a communication terminal, of which the received signal power has been measured two or more times by the measurement section, a most-recently measured received signal power being degraded relative to a previously-measured received signal power, is detected among the communication terminals for which the received data signals are determined as not having been demodulated without error by the determination section, the control section (i) assigns an earlier data slot time as a data retransmission time preferentially to the detected communication terminal over a communication terminal having a largest received signal power, and (ii) transmits a retransmission request signal that requests the detected communication terminal to retransmit the data signal at the assigned data retransmission time.

7. A communication method including:

an estimation step of estimating a transmission condition of each frequency channel among a plurality of frequency channels to be used for communication;

a reception step of receiving a data signal which has been transmitted from each of a plurality of communication terminals through any frequency channel among the plurality of frequency channels;

a measurement step of measuring a received signal power of the received data signal for each of the communication terminals;

a determination step of determining, for each of the communication terminals, whether or not the received data signal has been demodulated without error; and a control step of (i) assigning data slots times as data retransmission times to communication terminals, of the plurality of communication terminals, of which the received data signals are determined as not having been demodulated without error in the determination step, in such a manner that an earlier data slot time, among data slot times present in a repetitive manner, is assigned preferentially to a communication terminal, of the communication terminals having the data slot times assigned thereto, having a larger received signal power detected in the measurement step, and (ii) transmitting a retransmission request signal that requests the communication terminal having the larger received signal power to retransmit the data signal at the data retransmission time assigned to the communication terminal having the larger received signal power wherein, when assigning a same data retransmission time to two or more of the plurality of communication terminals, the control step assigns frequency channels, estimated as being in good transmission condition by the estimation step, to the two or more of the communication terminals in such a manner that a frequency channel, of the frequency channels estimated as being in good transmission condition, being in a better transmission condition is assigned preferentially to the communication terminal having the larger received signal power detected in the measurement step.

8. A communication method including:

a reception step of receiving data signals which have been transmitted from a plurality of communication terminals through a predetermined frequency channel;

a measurement step of measuring a received signal power of the received data signal for each of the communication terminals;

a determination step of determining, for each of the communication terminals, whether or not the received data signal has been demodulated without error; and a control step of (i) assigning data slot times as data retransmission times to communication terminals, of the plurality of communication terminals, of which the received data signals are determined as not having been demodulated without error in the determination step, in such a manner that an earlier data slot time, among data slot times present in a repetitive manner, is assigned preferentially to a communication terminal, of the communication terminals having the data slot times assigned thereto, having a larger received signal power detected in the measurement step, and (ii) transmitting a retransmission request signal that requests the communication terminal having the larger received signal power to retransmit the data signal at the data retransmission time assigned to the communication terminal having the larger received signal power, wherein, when a communication terminal, of which the received signal power has been measured two or more times in the measurement step, a most-recently measured received signal power being degraded relative to a previously-measured received signal power, is detected among the communication terminals for which the received data signals are determined as not having been demodulated without error in the determination step, the control step (i) assigns an earlier data slot time as a data retransmission time preferentially to the detected communication terminal over a communication terminal having a largest received signal power, and (ii) transmits a retransmission request signal that requests the detected communication terminal to retransmit the data signal at the assigned data retransmission time.

9. A non-transitory computer-readable recording medium having a communication program recorded thereon, the communication program being executable by a communication device operating as a base station in a network system, and the communication program causing a computer to execute a method including:

an estimation step of estimating a transmission condition of each frequency channel among a plurality of frequency channels to be used for communication;

a reception step of receiving a data signal which has been transmitted from each of a plurality of communication terminals through any frequency channel among the plurality of frequency channels;

a measurement step of measuring a received signal power of the received data signal for each of the communication terminals;

a determination step of determining, for each of the communication terminals, whether or not the received data signal has been demodulated without error; and a control step of (i) assigning data slots times as data retransmission times to communication terminals, of the plurality of communication terminals, of which the received data signals are determined as not having been demodulated without error in the determination step, in such a manner that an earlier data slot time, among data slot times present in a repetitive manner, is assigned preferentially to a communication terminal, of the communication terminals having the data slot times assigned thereto, having a larger received signal power detected in the measurement step, and (ii) transmitting a retransmission request signal that requests the communication terminal having the larger received signal power to retransmit the data signal at the data retransmission time assigned to the communication terminal having the larger received signal power, wherein, when assigning a same data retransmission time to two or more of the plurality of communication terminals, the control step assigns frequency channels, estimated as being in good transmission condition by the estimation step, to the two or more of the communication terminals in such a manner that a frequency channel, of the frequency channels estimated as being in good transmission condition, being in a better transmission condition is assigned preferentially to the communication terminal having the larger received signal power detected in the measurement step.

10. A non-transitory computer-readable recording medium having a communication program recorded thereon, the communication program being executable by a communication device operating as a base station in a network system, and the communication program causing a computer to execute a method including:

a reception step of receiving data signals which have been transmitted from a plurality of communication terminals through a predetermined frequency channel;

a measurement step of measuring a received signal power of the received data signal for each of the communication terminals;

a determination step of determining, for each of the communication terminals, whether or not the received data signal has been demodulated without error; and a control step of (i) assigning data slot times as data retransmission times to communication terminals, of the plurality of communication terminals, of which the received data signals are determined as not having been demodulated without error in the determination step, in such a manner that an earlier data slot time, among data slot times present in a repetitive manner, is assigned preferentially to a communication terminal, of the communication terminals having the data slot times assigned thereto, having a larger received signal power detected in the measurement step, and (ii) transmitting a retransmission request signal that requests the communication terminal having the larger received signal power to retransmit the data signal at the data retransmission time assigned to the communication terminal having the larger received signal power, wherein, when a communication terminal, of which the received signal power has been measured two or more times in the measurement step, a most-recently measured received signal power being degraded relative to a previously-measured received signal power, is detected among the communication terminals for which the received data signals are determined as not having been demodulated without error in the determination step, the control step (i) assigns an earlier data slot time as a data retransmission time preferentially to the detected communication terminal over a communication terminal having a largest received signal power, and (ii) transmits a retransmission request signal that requests the detected communication terminal to retransmit the data signal at the assigned data retransmission time.

11. An integrated circuit including:

an estimation section that estimates a transmission condition of each frequency channel among a plurality of frequency channels to be used for communication;

a reception section that receives a data signal which has been transmitted from each of a plurality of communication terminals through any frequency channel among the plurality of frequency channels;

a measurement section that measures a received signal power of the received data signal for each of the communication terminals;

a determination section that determines, for each of the communication terminals, whether or not the received data signal has been demodulated without error; and a control section that (i) assigns data slots times as data retransmission times to communication terminals, of the plurality of communication terminals, of which the received data signals are determined as not having been demodulated without error by the determination section, in such a manner that an earlier data slot time, among data slot times present in a repetitive manner, is assigned preferentially to a communication terminal, of the communication terminals having the data slot times assigned thereto, having a larger received signal power detected by the measurement section, and (ii) transmits a retransmission request signal that requests the communication terminal having the larger received signal power to retransmit the data signal at the data retransmission time assigned to the communication terminal having the larger received signal power, wherein, when assigning a same data retransmission time to two or more of the plurality of communication terminals, the control section assigns frequency channels, estimated as being in good transmission condition by the estimation section, to the two or more of the communication terminals in such a manner that a frequency channel, of the frequency channels estimated as being in good transmission condition, being in a better transmission condition is assigned preferentially to the communication terminal having the larger received signal power detected by the measurement section.

12. An integrated circuit including:

a reception section that receives data signals which have been transmitted from a plurality of communication terminals through a predetermined frequency channel;

a measurement section that measures a received signal power of the received data signal for each of the communication terminals;

a determination section that determines, for each of the communication terminals, whether or not the received data signal has been demodulated without error; and a control section that (i) assigns data slot times as data retransmission times to communication terminals, of the plurality of communication terminals, of which the received data signals are determined as not having been demodulated without error by the determination section, in such a manner that an earlier data slot time, among data slot times present in a repetitive manner, is assigned preferentially to a communication terminal, of the communication terminals having the data slot times assigned thereto, having a larger received signal power detected by the measurement section, and (ii) transmits a retransmission request signal that requests the communication terminal having the larger received signal power to retransmit the data signal at the data retransmission time assigned to the communication terminal having the larger received signal power, wherein, when a communication terminal, of which the received signal power has been measured two or more times by the measurement section, a most-recently measured received signal power being degraded relative to a previously-measured received signal power, is detected among the communication terminals for which the received data signals are determined as not having been demodulated without error by the determination section, the control section (i) assigns an earlier data slot time as a data retransmission time preferentially to the detected communication terminal over a communication terminal having a largest received signal power, and (ii) transmits a retransmission request signal that requests the detected communication terminal to retransmit the data signal at the assigned data retransmission time.

13. A network system comprising a plurality of communication terminals and a base station that communicates with the plurality of communication terminals, the base station including:

an estimation section that estimates a transmission condition of each frequency channel among a plurality of frequency channels to be used for communication;

a reception section that receives a data signal which has been transmitted from each of the plurality of communication terminals through any frequency channel among the plurality of frequency channels;

a measurement section that measures a received signal power of the received data signal for each of the communication terminals;

a determination section that determines, for each of the communication terminals, whether or not the received data signal has been demodulated without error; and a control section that (i) assigns data slots times as data retransmission times to communication terminals, of the plurality of communication terminals, of which the received data signals are determined as not having been demodulated without error by the determination section, in such a manner that an earlier data slot time, among data slot times present in a repetitive manner, is assigned preferentially to a communication terminal, of the communication terminals having the data slot times assigned thereto, having a larger received signal power detected by the measurement section, and (ii) transmits a retransmission request signal that requests the communication terminal having the larger received signal power to retransmit the data signal at the data retransmission time assigned to the communication terminal having the larger received signal power wherein, when assigning a same data retransmission time to two or more of the plurality of communication terminals, the control section assigns frequency channels, estimated as being in good transmission condition by the estimation section, to the two or more of the communication terminals in such a manner that a frequency channel, of the frequency channels estimated as being in good transmission condition, being in a better transmission condition is assigned preferentially to the communication terminal having the larger received signal power detected by the measurement section.

14. A network system comprising a plurality of communication terminals and a base station that communicates with the plurality of communication terminals, the base station including:
- a reception section that receives data signals which have been transmitted from the plurality of communication terminals through a predetermined frequency channel;
- a measurement section that measures a received signal power of the received data signal for each of the communication terminals;
- a determination section that determines, for each of the communication terminals, whether or not the received data signal has been demodulated without error; and
- a control section that (i) assigns data slot times as data retransmission times to communication terminals, of the plurality of communication terminals, of which the received data signals are determined as not having been demodulated without error by the determination section, in such a manner that an earlier data slot time, among data slot times present in a repetitive manner, is assigned preferentially to a communication terminal, of the communication terminals having the data slot times assigned thereto, having a larger received signal power detected by the measurement section, and (ii) transmits a retransmission request signal that requests the communication terminal having the larger received signal power to retransmit the data signal at the data retransmission time assigned to the communication terminal having the larger received signal power, wherein, when a communication terminal, of which the received signal power has been measured two or more times by the measurement section, a most-recently measured received signal power being degraded relative to a previously-measured received signal power, is detected among the communication terminals for which the received data signals are determined as not having been demodulated without error by the determination section, the control section (i) assigns an earlier data slot time as a data retransmission time preferentially to the detected communication terminal over a communication terminal having a largest received signal power, and (ii) transmits a retransmission request signal that requests the detected communication terminal to retransmit the data signal at the assigned data retransmission time.

15. The base station according to claim 2, wherein the estimation section calculates a success probability of communication in each frequency channel for a predetermined period of time up until a present time, based on a determination result of the determination section, and determines that a frequency channel having a higher communication success probability is a channel in a better transmission condition.

16. The base station according to claim 6, wherein the base station further includes an estimation section that estimates a transmission condition of each frequency channel among a plurality of frequency channels to be used for communication.

* * * * *